(12) United States Patent
Okada et al.

(10) Patent No.: US 7,924,476 B2
(45) Date of Patent: Apr. 12, 2011

(54) DOCUMENT READING APPARATUS AND IMAGE PROCESSING METHOD

(75) Inventors: Tomohiko Okada, Kyoto (JP); Shohichi Fukutome, Kyoto (JP); Yasuhiro Suto, Nara (JP); Hisashi Yamanaka, Nara (JP); Kenji Nakanishi, Nara (JP); Mitsuharu Yoshimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1040 days.

(21) Appl. No.: 11/784,265

(22) Filed: Apr. 6, 2007

(65) Prior Publication Data

US 2007/0242319 A1    Oct. 18, 2007

(30) Foreign Application Priority Data

Apr. 6, 2006  (JP) ................. 2006-105498

(51) Int. Cl.
*H04N 1/04* (2006.01)
(52) U.S. Cl. .................... 358/474; 358/486
(58) Field of Classification Search ............... 358/1.9, 358/406, 474, 516
See application file for complete search history.

(56) References Cited

U.S. PATENT DOCUMENTS

| | | | |
|---|---|---|---|
| 5,089,859 A * | 2/1992 | Kusumoto et al. | 399/178 |
| 5,767,991 A * | 6/1998 | Hara | 358/518 |
| 5,809,366 A * | 9/1998 | Yamakawa et al. | 399/39 |
| 6,175,429 B1 | 1/2001 | Nagaharu et al. | |
| 6,335,747 B1 * | 1/2002 | Munakata | 347/116 |
| 6,587,224 B1 * | 7/2003 | Nabeshima et al. | 358/1.9 |
| 2005/0206978 A1 * | 9/2005 | Sone | 358/516 |

FOREIGN PATENT DOCUMENTS

| | | |
|---|---|---|
| JP | 09-027955 | 1/1997 |
| JP | 10-319305 | 12/1998 |
| JP | 11-088613 | 3/1999 |

* cited by examiner

*Primary Examiner* — King Y Poon
*Assistant Examiner* — Allen H Nguyen
(74) *Attorney, Agent, or Firm* — Edwards Angell Palmer & Dodge LLP; David G. Conlin; Catherine J. Toppin

(57) ABSTRACT

A document table is provided with a first chart portion and a second chart portion. In each of the first chart portion and the second chart portion, a reference chart is formed. The first chart portion is disposed at an upstream chart position, and the second chart portion is disposed at a downstream-side position located away in a sub-scanning direction from the upstream chart position. On the basis of respective chart images of the first chart portion and second chart portion obtained from respective reference charts of the first and second chart portions read by a document reading portion, the image processing portion obtains respective sharpening levels for respective image areas of a document image of a document read by the document reading portion and, based on the respective sharpening levels, processes the document image.

13 Claims, 21 Drawing Sheets

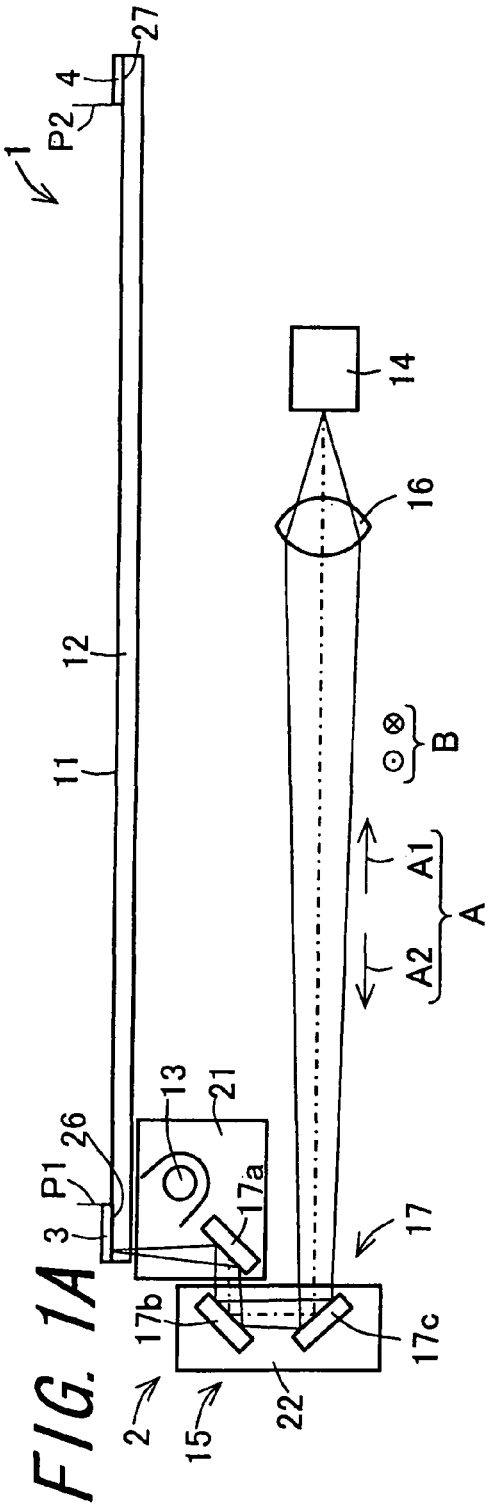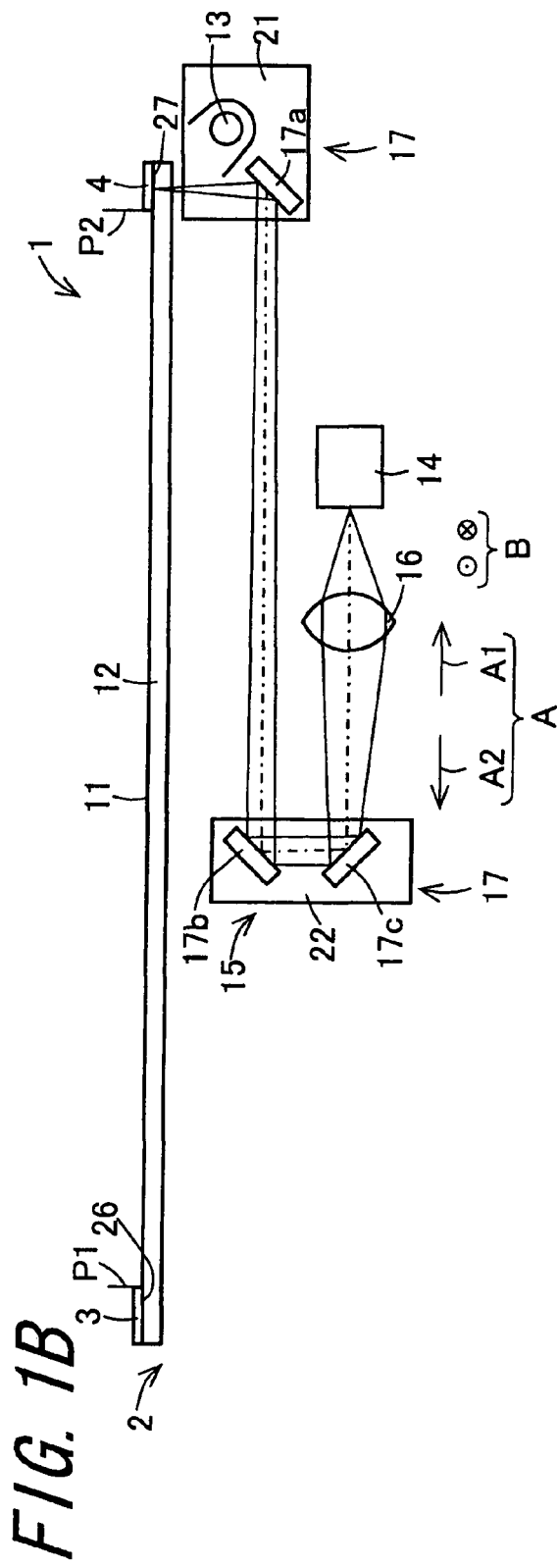

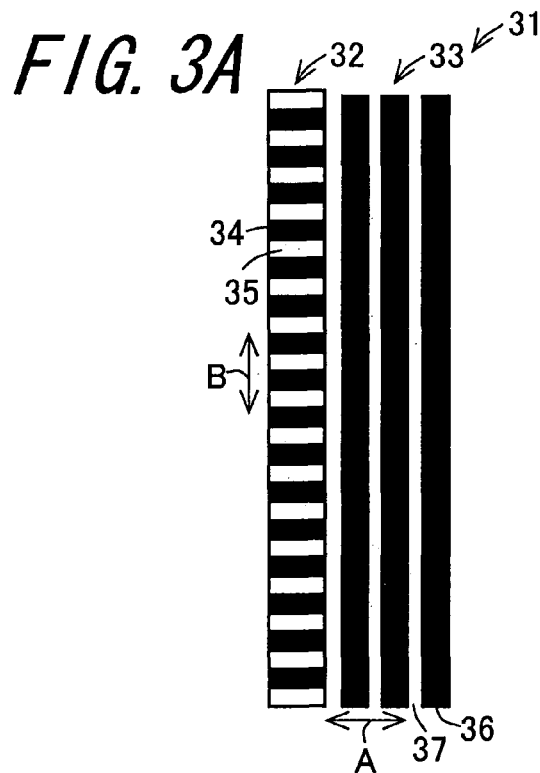
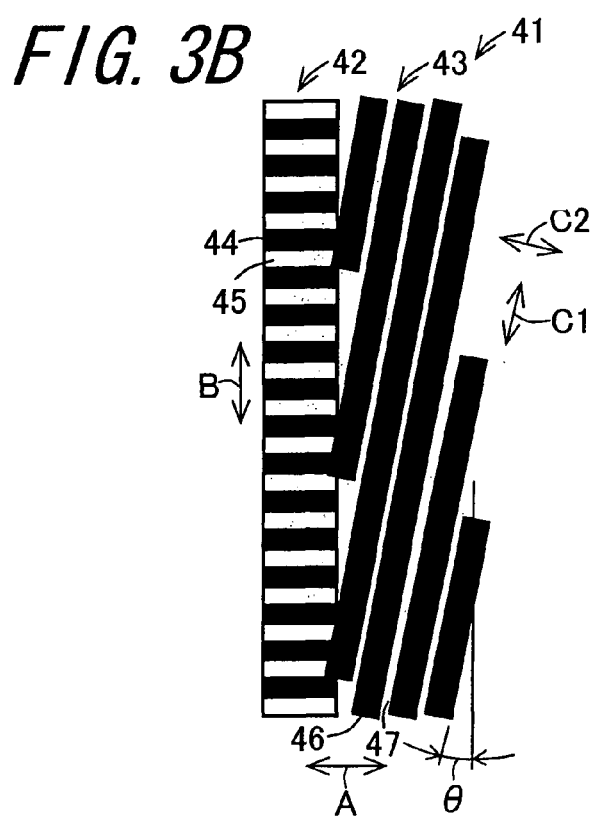

FIG. 8A

| 0 | 0 | 0 |
|---|---|---|
| b1 | a1 | b1 |
| 0 | 0 | 0 |

FIG. 8B

| 0 | 0 | 0 |
|---|---|---|
| −0.43 | 1.87 | −0.43 |
| 0 | 0 | 0 |

FIG. 8C

| 0 | 0 | 0 |
|---|---|---|
| −0.23 | 1.45 | −0.23 |
| 0 | 0 | 0 |

FIG. 8D

| 0 | 0 | 0 |
|---|---|---|
| −0.13 | 1.26 | −0.13 |
| 0 | 0 | 0 |

FIG. 8E

| 0 | b2 | 0 |
|---|---|---|
| 0 | a2 | 0 |
| 0 | b2 | 0 |

FIG. 8F

| 0 | −0.43 | 0 |
|---|---|---|
| 0 | 1.87 | 0 |
| 0 | −0.43 | 0 |

FIG. 8G

| 0 | −0.23 | 0 |
|---|---|---|
| 0 | 1.45 | 0 |
| 0 | −0.23 | 0 |

FIG. 8H

| 0 | −0.13 | 0 |
|---|---|---|
| 0 | 1.26 | 0 |
| 0 | −0.13 | 0 |

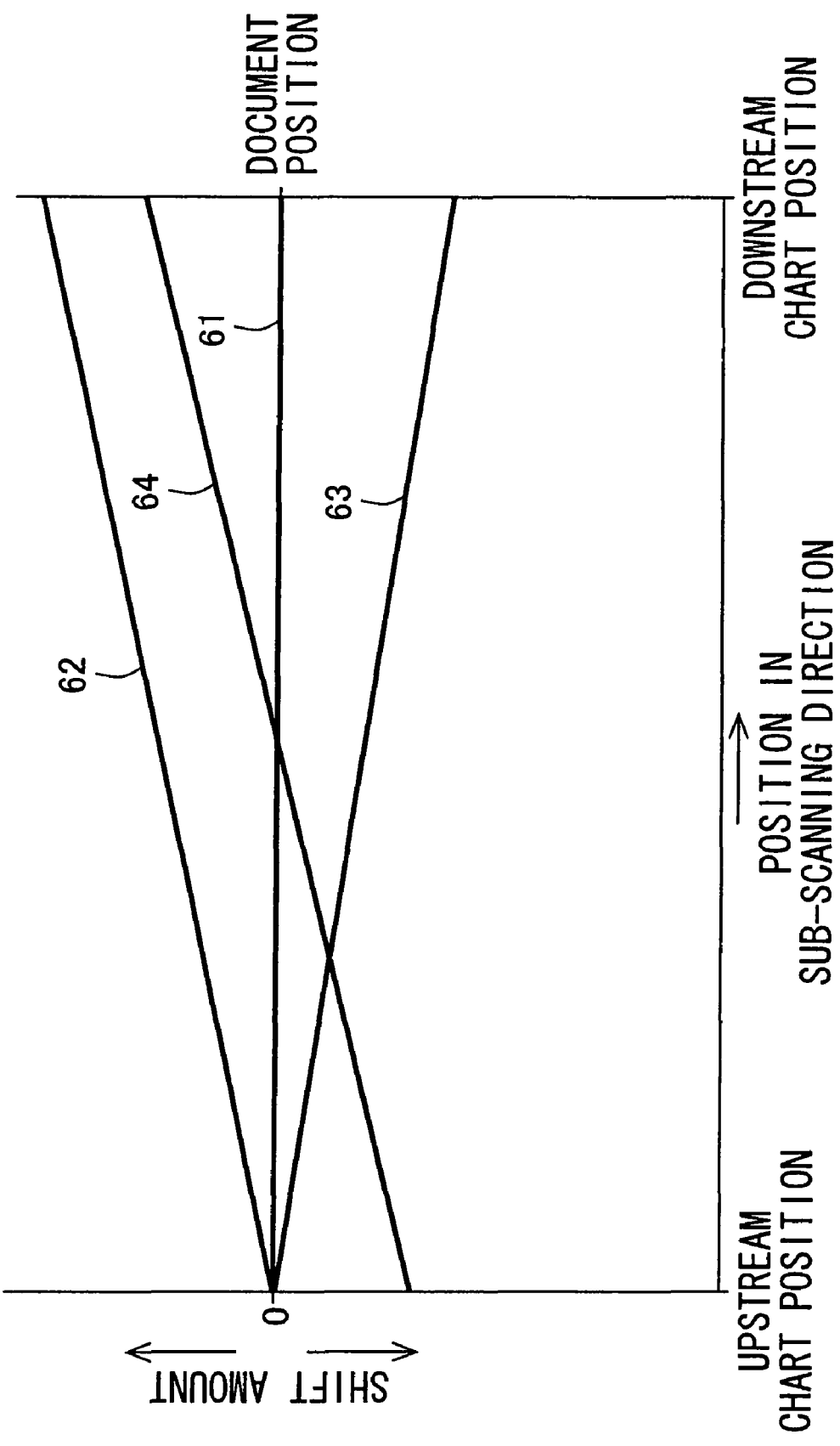

DOCUMENT READING APPARATUS AND IMAGE PROCESSING METHOD

CROSS-REFERENCE TO RELATED APPLICATION

This application claims priority to Japanese Patent Application No. 2006-105498, which was filed on Apr. 6, 2006, the contents of which, are incorporated herein by reference, in their entirety.

BACKGROUND OF THE INVENTION

1. Field of the Invention

The present invention relates to a document reading apparatus that reads a document and processes a document image of a read document. Further, the present invention relates to an image processing method of processing a document image of a read document.

2. Description of the Related Art

A document reading apparatus comprises a document reading portion including a document table having a document placement surface, a light source for exposing a document placed on the document placement surface to light, an imaging element for receiving light from the document exposed by the light source, and an imaging optical system for focusing the light from the document onto the imaging element to thereby form an image thereon. The imaging optical system has an imaging lens and a group of mirrors which lead the light from the document to the imaging lens. In the documents reading apparatus, by imaging the light from the document placed on the document placement surface sequentially line by line along a main scanning direction of the document on the imaging element while moving the group of mirrors in a sub-scanning direction relative to the document table, the document can be read.

In the document reading apparatus as described above, the group of mirrors is made to move for reading the document placed on the document placement surface and therefore, it is structurally difficult to hold the entire part of the document in focus at the same time. Focusing on a part of the document causes the remaining part of the document to be out of focus.

The focus adjustment at a focus adjustment step in manufacturing the document reading apparatus is achieved by focusing on the document at a document-reading start position. In this case, there will be seen a gradual increase in loss of focus on the document from the document-reading start position toward a document-reading end position. In consideration of this point, the focus adjustment may be achieved by shifting the focal spot at the document-reading start position in the reverse direction in anticipation of loss of focus at the document-reading end position. In this case, focusing on the document can be attained only at an intermediate position between the document-reading start position and the document-reading end position.

As described above, in the document reading apparatus of conventional design, it is structurally difficult to focus on the entire part of the document, thus causing a problem that the quality of the document image of the read document is hard to be equalized overall.

Japanese Unexamined Patent Publication JP-A 10-319305 (1998) discloses a technique that a lens carriage on which a lens and an image sensor are mounted, is made to move pitch by pitch so that black stripes and white background on a focus adjustment plate are read, to thereby obtain a position of the lens carriage exhibiting the maximum contrast, at which position the lens carriage is fixed. The focus adjustment plate is attached to a front portion at a document-reading start position. The technique just described is not able to solve the above-described problem because, in the technique, the focus adjustment is carried out only one place in the sub-scanning direction.

Further, in the case where the document image is a color image, it is difficult to eliminate a color shift from the entire document image. The color shift means that positions of respective colors in the document image are shifted relatively from each other. Such a color shift can be corrected to some extent, by adoption of achromatic setting in which a glass dispersion property is utilized, or by interposition of a diffractive-optical element between the document and the imaging element. However, these solutions will cause troubles such as an increase in production cost, a decrease in light transmission, and an increase in size of the apparatus, and moreover, it is difficult to compensate the temperature.

SUMMARY OF THE INVENTION

An object of the invention is to provide an image reading apparatus in which easy equalization in quality of an entire document image can be achieved by processing a scanned document image, and an image processing method.

The invention provides a document reading apparatus comprising:

a document reading portion including a document table having a document placement surface, a light source for exposing a document placed on the document placement-surface to light, an imaging element for receiving light from the document exposed by the light source, and an imaging optical system for focusing the light from the document onto the imaging element to thereby form an image thereon, which imaging optical system has an imaging lens and a group of mirrors which moves in a sub-scanning direction relative to the document table and leads the light from the document to the imaging lens;

a first chart portion having a predetermined reference chart, which is disposed at a predetermined first position on the document table;

a second chart portion having the predetermined reference chart, which is disposed at a predetermined second position spaced away in the sub-scanning direction from the predetermined first position on the document table; and an image processing portion that obtains, based on respective chart images of the first and second chart portions which chart images are obtained from the predetermined reference charts read by the document reading portion, respective correction amounts of a plurality of image areas arranged in the sub-scanning direction in a document image of the document read by the document reading portion, and then based on the respective correction amounts, processes the document image.

According to the invention, the document is placed on the document placement surface of the document table. The document is exposed by the light source. The light from the document is focused onto the imaging element to form an image thereon by the imaging optical system which then receives the light. The imaging optical system has the imaging lens and the group of mirrors which moves in the sub-scanning direction relative to the document table and leads the light from the document to the imaging lens. In such a document reading portion, by imaging the light from the document placed on the document placement surface sequentially line by line along a main scanning direction of the document on the imaging element while moving the group of mirrors in a sub-scanning direction relative to the document table, the document can be read.

The document table is provided with the first and second chart portions. In each of the first and second chart portions, the predetermined reference chart is formed. The first chart portion is disposed at the predetermined first position on the document table while the second chart portion is disposed at the predetermined second position spaced away in the sub-scanning direction from the predetermined first position on the document table.

On the basis of the respective chart images of the first and second chart portions which chart images are obtained from the predetermined reference charts read by the document reading portion, the image processing portion obtains the respective correction amounts of a plurality of image areas arranged in the sub-scanning direction in the document image of the document read by the document reading portion, and on the basis of the respective correction amounts, the image processing portion processes the document image. As described above, the processing on the document image allows equalization of quality of the entire document image with ease.

Further, in the invention, it is preferable that the image processing portion obtains, based on the respective chart images, respective correction amounts of a plurality of image areas arranged in the sub-scanning direction in the document image regarding a plurality of image areas arranged in a main scanning direction in the document image, and then based on the respective correction amounts, processes the document image.

According to the invention, on the basis of the respective chart images, the image processing portion obtains the respective correction amounts of a plurality of image areas arranged in the sub-scanning direction in the document image regarding a plurality of image areas arranged in the main scanning direction in the document image, and then based on the respective correction amounts, the image processing portion processes the document image. As described above, the processing on the document image allows equalization of quality of the entire document image with ease.

Further, in the invention, it is preferable that the document reading portion reads the document separately from one color to another among respective colors of red, green, and blue, and the image processing portion processes the document image separately from one color to another among the respective colors.

According to the invention, the document reading portion reads the document separately from one color to another among the respective colors of red, green, and blue. The image processing portion processes the document image separately from one color to another among the respective colors. Consequently, the quality of the document image can be equalized overall even with the chromatic aberration.

Further, in the invention, it is preferable that the image processing portion performs a filtering process to the document image.

According to the invention, the image processing portion performs the filtering process to the document image based on the respective correction amounts, with the result that the quality of the document image can be equalized overall.

Further, in the invention, it is preferable that the image processing portion sharpens the document image through the filtering process.

According to the invention, the document image is sharpened through the filtering process based on the respective correction amounts so that the out-of-focus image area is sharpened, thus resulting in a document image which is clear and sharp overall.

Further, in the invention, it is preferable that the image processing portion smoothens the document image through the filtering process.

According to the invention, the image forming apparatus smoothens the document image through the filtering process based on the respective correction amounts so that the image area in focus is smoothened, thus resulting in a document image which is smooth overall.

Further, in the invention, it is preferable that the first chart portion and the second chart portion respectively have a first chart-formed surface in which the predetermined reference chart is formed and which abuts on the document placement surface, and a pair of second chart-formed surfaces in each of which the predetermined reference chart is formed and which are disposed across the document placement surface so that a distance between one second chart-formed surface and the document placement surface is equal to a distance between another second chart-formed surface and the document placement surface.

According to the invention, the first chart portion and the second chart portion respectively have the first chart-formed surface and a pair of the second chart-formed surfaces. In each of the first chart-formed surface and the second chart-formed surfaces, the predetermined reference chart is formed. The first chart-formed surface abuts on the document placement surface. The first chart-formed surface as described above is used to obtain an evaluation value for evaluating a shift amount between the document-side focused focal position and the document position to then obtain a correction amount based on the evaluation value. The respective second chart-formed surfaces are disposed on both sides of the document placement surface so that a distance between the one second chart-formed surface and the document placement surface is as long as a distance between the other second chart-formed surface and the document placement surface. The second chart-formed surfaces as described above are used to determine a direction in which the document-side focused focal position is shifted relative to the document position.

The use of the first char portion and second chart portion as described above allows equalization of quality of the entire document image even in the case where the document-side focused focal position at the predetermined first position and the document-side focused focal position at the predetermined second position are shifted so as to be located on either side of the document position, and the document-side focused focal position corresponds to the document position between the predetermined first position and the predetermined second position.

Further, in the invention, it is preferable that the first chart portion and the second chart portion respectively have the predetermined reference chart formed therein and a chart-formed surface which is inclined to the document placement surface and protrudes from the document placement surface to both sides of the document placement surface.

According to the invention, the first chart portion and the second chart portion respectively have the chart-formed surface. In the chart-formed surface, the predetermined reference chart is formed. The chart-formed surface is inclined to the document placement surface and protrudes from the document placement surface to the both sides of the document placement surface. The chart-formed surface as described above is used to obtain an evaluation value for evaluating a shift amount between the document-side focused focal position and the document position to then obtain a correction amount based on the evaluation value. Further, the chart-formed surface as described above is used to determine a direction in which the document-side focused focal position is shifted relative to the document placement surface.

The use of the first and second chart portions as described above allows equalization in quality of the entire document image even in the case where the document-side focused focal position at the predetermined first position and the document-side focused focal position at the predetermined second position are shifted so as to be located on either side of the document position, and the document-side focused focal position corresponds to the document position between the predetermined first position and the predetermined second position.

Further, in the invention, it is preferable that the predetermined reference chart has a first ladder chart composed of sets of two lines extending in the sub-scanning direction, which are different in density and alternately arranged in the main scanning direction, and a second ladder chart composed of sets of two lines extending in the main scanning direction, which are different in density and alternately arranged in the sub-scanning direction.

According to the invention, the first ladder chart is composed of sets of two lines extending in the sub-scanning direction, which are different in density and alternately arranged in the main scanning direction. The first ladder chart as described above is used to obtain an evaluation value for evaluating a shift amount in the main scanning direction between the document-side focused focal position and the document position to then obtain a correction amount based on the evaluation value. Further, the second ladder chart is composed of sets of two lines extending in the main scanning direction, which are different in density and alternately arranged in the sub-scanning direction. The second ladder chart as described above is used to obtain an evaluation value for evaluating a shift amount in the sub-scanning direction between the document-side focused focal position and the document position to then obtain a correction amount based on the evaluation value. The predetermined reference chart has both of the first ladder chart and the second ladder chart. The use of the first and second chart portions in each of which the predetermined reference chart as described above is formed, allows the document image to be precisely processed by taking also the astigmatism into consideration so that the quality of the document image can be equalized overall.

Further, in the invention, it is preferable that the predetermined reference chart has a first ladder chart composed of sets of two lines extending in the sub-scanning direction, which are different in density and alternately arranged in the main scanning direction, and a second ladder chart composed of sets of two lines which extend in a first direction intersecting with the main scanning direction in the document placement surface and which are different in density and alternately arranged in a second direction orthogonal to the first direction in the document placement surface.

According to the invention, the first ladder chart is composed of sets of two lines extending in the sub-scanning direction, which are different in density and alternately arranged in the main scanning direction. The first ladder chart as described above is used to obtain an evaluation value for evaluating a shift amount in the main scanning direction between the document-side focused focal position and the document position to then obtain a correction amount based on the evaluation value. Further, the second ladder chart is composed of sets of two lines which extend in the first direction intersecting with the main scanning direction in the document placement surface and which are different in density and alternately arranged in the second direction orthogonal to the first direction in the document placement surface. The second ladder chart as described above is used to obtain an evaluation value for evaluating a shift amount in the sub-scanning direction between the document-side focused focal position and the document position to then obtain a correction amount based on the evaluation value. The predetermined reference chart has both of the first ladder chart and the second ladder chart. The use of the first and second chart portions in each of which the predetermined reference chart as described above is formed, allows the document image to be precisely processed by taking also the astigmatism into consideration so that the quality of the document image can be equalized overall.

Further, in the invention, it is preferable that the first chart portion and the second chart portion are detachably disposed on the document table.

According to the invention, the first chart portion and the second chart portion are detachably disposed on the document table, with the result that the first chart portion and the second chart portion can be attached onto the document table only on the occasions of manufacture or periodic inspections, thus allowing enhancement in convenience.

Further, in the invention, it is preferable that the image processing portion sets one color among the respective colors as a criterion, and moves the document images of remaining colors relative to the document image of the one color acting as the criterion.

According to the invention, the image processing portion sets one color among the respective colors as a criterion, and moves the document images of the remaining colors relative to the document image of the one color acting as the criterion, with the result that the color shift caused by the chromatic aberration can be eliminated so that the quality of the document image can be equalized overall.

Further, the invention provides an image processing method of processing a document image of a document read by a document reading portion including a document table having a document placement surface, a light source for exposing a document placed on the document placement surface to light, an imaging element for receiving light from the document exposed by the light source, and an imaging optical system for focusing the light from the document onto the imaging element to thereby form an image thereon, wherein the imaging optical system has an imaging lens and a group of mirrors which moves in a sub-scanning direction relative to the document table and leads the light from the document to the imaging lens, the image processing method comprising the steps of:

obtaining respective chart images of first chart portion and second chart portion by using the document reading portion to read a predetermined reference chart formed on a first chart portion disposed at a predetermined first position on the document table, and the predetermined reference chart formed on a second chart portion disposed at a predetermined second position spaced away in the sub-scanning direction from the predetermined first position on the document table; and obtaining, based on the respective chart images, respective correction amounts of a plurality of image areas arranged in the sub-scanning direction in the document image, and then based on the respective correction amounts, processing the document image.

According to the invention, the document image of the document is processed which is read by the document reading portion including the document table having the document placement surface, the light source for exposing the document placed on the document placement surface to light, the imaging element for receiving the light from the document exposed by the light source, and the imaging optical system for focusing the light from the document onto the imaging element to thereby form an image thereon, wherein the imaging optical system has the imaging lens and the group of mirrors which moves in the sub-scanning direction relative to the document table and leads the light from the document to the imaging lens.

At the outset, the respective chart images of the first and second chart portions are obtained. In the first chart portion is formed a predetermined reference chart. The first chart portion is disposed at the predetermined first position on the document table. In the second chart portion is formed the predetermined reference chart. The second chart portion is disposed at the predetermined second position spaced away in the sub-scanning direction from the predetermined first position on the document table. The document reading portion reads the respective predetermined reference charts of the first and second chart portions, thereby obtaining respective chart images of the first and second chart portions.

Subsequently, on the basis of the respective chart images, the respective correction amounts of the plurality of the image areas arranged in the sub-scanning direction in the document image are obtained, and then based on the respective correction amounts, the document image is processed. As described above, the processing on the document image allows equalization of quality of the entire document image with ease.

BRIEF DESCRIPTION OF THE DRAWINGS

Other and further objects, features, and advantages of the invention will be more explicit from the following detailed description taken with reference to the drawings wherein:

FIGS. 1A and 1B are views each showing a part of a document reading apparatus according to a first embodiment of the invention;

FIGS. 3A and 3B are front views each showing a reference chart;

FIGS. 8A to 8H are views each showing a sharpening filter used for sharpening the document image;

FIG. 12 is a graph showing a shift of the document-side focused focal position relative to the document position at various positions in the sub-scanning direction A;

DETAILED DESCRIPTION

Figure 2:
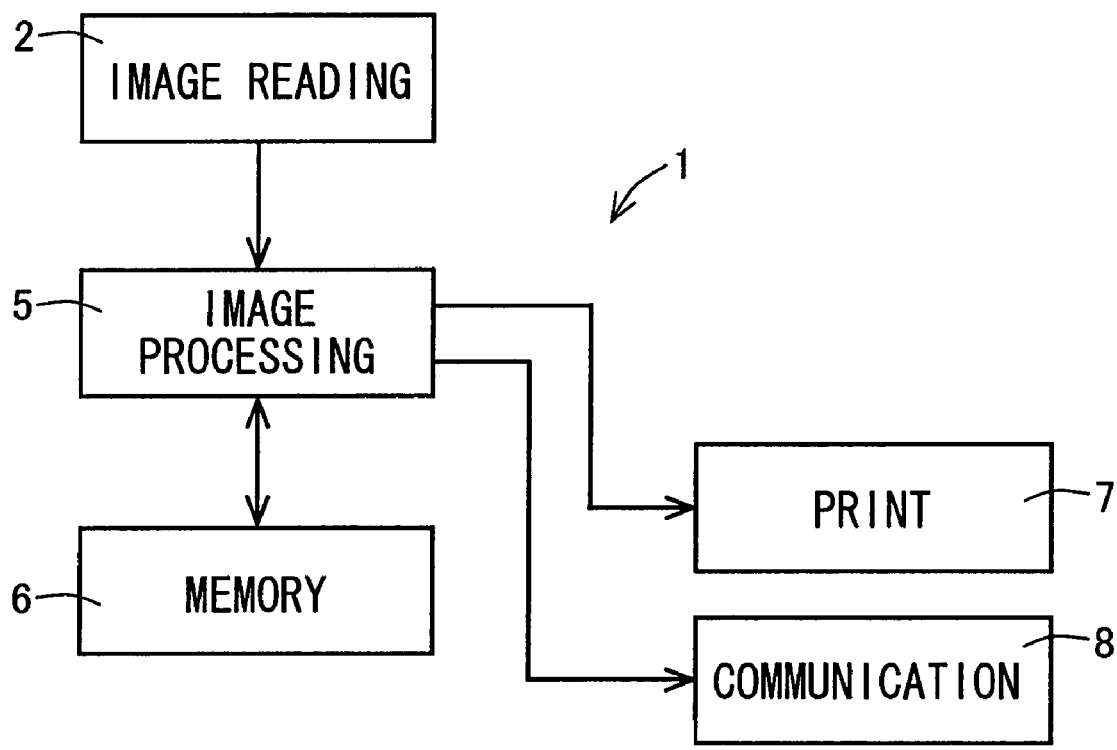
FIG. 2 is a block diagram of the document reading apparatus.

Now referring to the drawings, preferred embodiments of the invention are described below.

FIGS. 1A and 1B are views each showing a part of a document reading apparatus 1 according to a first embodiment of the invention. FIG. 1A shows the document reading apparatus 1 having a document reading portion 2 reading a first chart portion 3 while FIG. 1B shows the document reading apparatus 1 having the document reading portion 2 reading a second chart portion 4. FIG. 2 is a block diagram of the document reading apparatus 1. The document reading apparatus 1 according to the present embodiment is used for reading a document, which is specifically a reflecting-type document.

The document reading apparatus 1 comprises the document reading portion 2, the first chart portion 3, the second chart portion 4, an image processing portion 5, a memory portion 6, a print portion 7, and a communication portion 8. The memory portion 6 stores information which is necessary for the image processing portion 5 to process an image. The print portion 7 prints and thus outputs the image which has been processed by the image processing portion 5. The communication portion 8 transfers the image from the image processing portion 5 to an external equipment.

The document reading portion 2 comprises a document table 12 having a document placement surface 11, a light source 13 for exposing a document placed on the document placement surface 13 to light, an imaging element 14 for receiving light from the document exposed by the light source 13, and an imaging optical system 15 for focusing the light from the document onto the imaging element 14 to thereby form an image thereon. The document table 12 is made of a light-transmitting glass and formed into a rectangular plate-like shape. The document placement surface 11 constitutes one thickness-wise surface of the document table 12. The light source 13, the imaging element 14, and the imaging optical system 15 are disposed on the side of the document table 12 opposite to the document placed on the document placement surface 11 of the document table 12, across the document table 12. The imaging element 14 is realized by a color CCD line image sensor.

The imaging optical system 15 has an imaging lens 16 and a group of mirrors 17 which leads the light from the document to the imaging lens 16. The group of mirrors 17 includes a first mirror 17a, a second mirror 17b, and a third mirror 17c. The light from the document is reflected sequentially by the first to third mirrors 17a to 176 to be thereby led to the imaging lens 16. The first mirror 17a is mounted on a first scanning unit 21 while the second mirror 17b and the third mirror 17c are mounted on a second scanning unit 22. The first scanning unit 21 has also the light source 13 mounted thereon.

The first scanning unit 21 moves in a reading direction A1 of reading the document (from left to right on the drawing pages of FIG. 1A and FIG. 1B) along the document table 12 at a constant speed V. Hereinafter, the reading direction A1 and its opposite direction A2 are collectively referred to as a sub-scanning direction A. The second scanning unit 22 moves in the reading direction A1 at a speed V/2 which is half the speed V of the first scanning unit 21. Such movements of the first scanning unit 21 and second scanning unit 22 make the group of mirrors 17 move in the reading direction A1 along the document table 12. This allows the document reading portion 2 to read the document placed on the document placement surface 11 by sequentially forming image parts on the imaging element 14 upon every one line in a main scanning direction B of the document image. The main scanning direction B is orthogonal to the sub-scanning direction A in the document placement surface 11. In the embodiment, a width direction of the document table 12 is parallel to the main scanning direction B while a longitudinal direction of the document table 12 is parallel to the sub-scanning direction A.

The first chart portion 3 is a plate-like long member. The first chart portion 3 has a chart-formed surface 26 in which a predetermined reference chart (hereinafter referred to simply as "reference chart") is formed. The chart-formed surface 26 constitutes one thickness-wise surface of the first chart portion 3. The first chart portion 3 is provided on the document table 12 in such a manner that a longitudinal direction of the first chart portion 3 is parallel to the main scanning direction B and that the chart-formed surface 26 of the first chart portion 3 contacts the document placement surface 11. The first chart portion 3 is disposed at a predetermined first position. In the embodiment, the first chart portion 3 is disposed at an end portion of the document table 12, which end portion is located upstream in the reading direction A1. In this case, a position in the sub-scanning direction A on an end face of the first chart portion 3, which end face is located downstream in the reading direction A1, is referred to as a document reading start position P1 at which the document starts to be read. Hereinafter, "the predetermined first position" will be referred to as "an upstream chart position".

The second chart portion 4 is a plate-like long member. The second chart portion 4 has a chart-formed surface 27 in which the reference chart is formed. The second chart portion 4 constitutes one thickness-wise surface of the second chart portion 4. The second chart portion 4 is provided on the document table 12 in such a manner that a longitudinal direction of the second chart portion 4 is parallel to the main scanning direction B and that the chart-formed surface 27 of the second chart portion 4 contacts the document placement surface 11. The second chart potion 4 is disposed at a predetermined second position which is distanced downstream in the reading direction A1 away from the upstream chart position. In the embodiment, the second chart portion 4 is disposed at an end portion of the document table 12, which end portion is located downstream in the reading direction A1. In this case, a position in the sub-scanning direction A on an end face of the second chart portion 4, which end face is located upstream in the reading direction A1, is referred to as a document reading end position P2 at which the reading of the document is brought to an end. Hereinafter, "the predetermined second position" will be referred to as "a downstream chart position".

The first chart portion 3 and the second chart portion 4 as described above are detachably disposed on the document table 12. It is thus possible to attach the first chart portion 3 and the second chart portion 4 onto the document table 12 only on the occasions of manufacture or periodic inspections, allowing enhancement in convenience.

The image processing portion 5 receives respective images of the first and second chart portions 3 and 4 obtained from the respective reference charts of the first and second chart portions 3 and 4 read by the document reading portion 2, or the document image of the document read by the document reading portion 2. The image processing portion 5 obtains, based on the respective chart images, respective correction amounts of a plurality of image areas arranged in the sub-scanning direction A in the document image regarding a plurality of image areas arranged in the main scanning direction B in the document image, and based on the respective correction amounts, the image processing portion 5 processes the document image. The image processing portion 5 is realized by a processing circuit having a central processing unit (abbreviated as CPU).

FIGS. 3A and 3B are front views each showing a reference chart. FIG. 3A shows one example of the reference charts and FIG. 3B shows another example of the reference charts. The reference chart formed in the chart-formed surface of the first chart portion 3 is the same as the reference chart formed in the chart-formed surface of the second chart portion 4. The reference chart is formed into a repeating pattern composed of two regions which are different in density. Herein, the descriptions will be given on the assumption that the first chart portion 3 and the second chart portion 4 have been attached onto the document table 12.

In the one example shown in FIG. 3A, a reference chart 31 has a first ladder chart 32 and a second ladder chart 33. The first ladder chart 32 is composed of sets of two lines extending in the sub-scanning direction A, which are different in density and alternately arranged in the main scanning direction B. The second ladder chart 33 is composed of sets of two lines extending in the main scanning direction B, which are different in density and alternately arranged in the sub-scanning direction B. In the present example, the first ladder chart 32 is composed of black lines 34 extending in the sub-scanning direction A and white lines 35 extending in the sub-scanning direction A, in which the black lines 34 and the white lines 35 are alternately arranged in the main scanning direction B, and the second ladder chart 33 is composed of black lines 36 extending in the main scanning direction B and white lines 37 extending in the main scanning direction B, in which the black lines 36 and the white lines 37 are alternately arranged in the sub-scanning direction A.

The first ladder chart 32 is used to obtain an evaluation value for evaluating a shift amount in the main scanning direction B between a document-side focused focal position and a document position (hereinafter referred to simply as "an evaluation value in the main scanning direction B"), and then based on such an evaluation value, obtain the correction amount. The second ladder chart 33 is used to obtain an evaluation value for evaluating a shift amount in the sub-scanning direction A between a document-side focused focal position and a document position (hereinafter referred to simply as "an evaluation value in the sub-scanning direction A"), and then based on such an evaluation value, obtain the correction amount. The use of the first and second chart portions 3 and 4 in each of which such a reference chart 31 is formed, allows the document image to be precisely processed by taking also the astigmatism into consideration.

In the embodiment, the document-side focused focal position means a position of the document at which the light from the document can be focused onto the imaging element 14 by the imaging lens 16 to form an image thereon when positions of the imaging element 14 and the imaging lens 16 are fixed.

The concentration of the first ladder chart 32 and the second ladder chart 33 is respectively, for example, 5 lp/m. In other words, the first ladder chart 32 contains five sets of the black lines 34 and the white lines 35 in the length of 1 mm in the main scanning direction B while the second ladder chart 33 contains five sets of the black lines 36 and the white lines 37 in the length of 1 mm in the sub-scanning direction A.

In another example shown in FIG. 3B, a reference chart 41 has a first ladder chart 42 and a second ladder chart 43. The first ladder chart 42 is composed of sets of two lines extending in the sub-scanning direction A, which are different in density and alternately arranged in the main scanning direction B. The second ladder chart 43 is composed of sets of two lines which extend in a first direction C1 intersecting with the main scanning direction B in the document placement surface 11 and which are different in density and alternately arranged in a second direction C2 orthogonal to the first direction C1 in the document placement surface 11. In the present example, the first ladder chart 42 is composed of black lines 44 extending in the sub-scanning direction A and white lines 45 extending in the sub-scanning direction A, in which the black lines 44 and the white lines 45 are alternately arranged in the main scanning direction B, and the second ladder chart 43 is composed of black lines 46 extending in the first direction C1 and white lines 47 extending in the first direction C1, in which the black lines 46 and the white lines 47 are alternately arranged in the second direction C2.

The first ladder chart 42 is used to obtain an evaluation value in the main scanning direction B, and then based on such an evaluation value, obtain the correction amount. The second ladder chart 43 is used to obtain the evaluation value in the sub-scanning direction A, and then based on such an evaluation value, obtain the correction amount. The use of the first and second chart portions 3 and 4 in which such a reference chart 41 is formed, allows the document image to be precisely processed by taking also the astigmatism into consideration.

The concentration of the first ladder chart 42 and the second ladder chart 43 is respectively, for example, 5 lp/m. In other words, the first ladder chart 42 contains five sets of the black lines 44 and the white lines 45 in the length of 1 mm in the main scanning direction B while the second ladder chart 43 contains five sets of the black lines 46 and the white lines 47 in the length of 1 mm in the first direction C1.

An angle θ formed by the first direction C1 and the main scanning direction B is selected to exceed 0° and be less than 45°. This makes it possible to obtain a precise evaluation value in the sub-scanning direction A by reading one line in the main scanning direction B. In the case where the angle θ formed by the first direction C1 and the main scanning direction B is 0°, the evaluation value in the sub-scanning direction A cannot be obtained by reading one line in the main scanning direction B. In the case where the angle θ formed by the first direction C1 and the main scanning direction B is 45° or more, it is not possible to obtain a precise evaluation value in the sub-scanning direction A due to the influence of the shift amount in the main scanning direction B between the document-side focused focal position and the document position.

Figure 4:
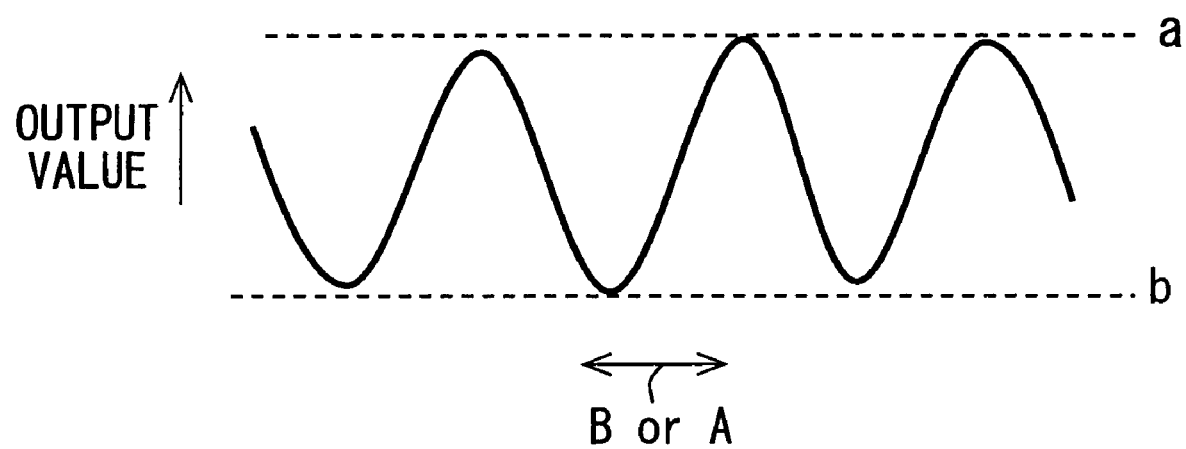
FIG. 4 is a view showing a waveform of a reading signal taken from the reference chart.

FIG. 4 is a view showing a waveform of a reading signal taken from the reference chart. In FIG. 4, a horizontal axis represents a position in the main scanning direction B or the sub-scanning direction A while a vertical axis represents an output value of the reading signal. When the reference chart is read by the document reading portion 2, the output value of the reading signal outputted from the imaging element 14 changes as shown in FIG. 4, depending on the position in the main scanning direction B or the sub-scanning direction A. The output value of the reading signal is smaller at a position corresponding to the black lines of the reference chart than a position corresponding to the white lines of the reference chart.

On the basis of the chart image of the first chart portion 3 obtained from the reference chart of the first chart portion 3 read by the document reading portion 2, the image processing portion 5 obtains the evaluation value in the main scanning direction B and the evaluation value in the sub-scanning direction A at plural positions in the main scanning direction B at the upstream chart position. Further, on the basis of the chart image of the second chart portion 4 obtained from the reference chart of the second chart portion 4 read by the document reading portion 2, the image processing portion 5 obtains the evaluation value in the main scanning direction B and the evaluation value in the sub-scanning direction A at plural positions in the main scanning direction B at the downstream chart position.

In the embodiment, the image processing portion 5 obtains a contrast transfer function value (abbreviated as CTF value) as an evaluation value. The CTF value is obtained in such a manner that a difference between the maximum value of the output value of the reading signal and the minimum value of the output value of the reading signal is divided by a sum of the maximum value of the output value of the reading signal and the minimum value of the output value of the reading signal. In other words, the CTF value is obtained in the following formula (1) wherein "a" represents the maximum value of the output value of the reading signal and "b" represents the minimum value of the output value of the reading signal. The larger the shift amount between the document-side focused focal position and the document position is, the smaller the CTF value is.

$$\text{CTF value} = (a-b)/(a+b) \quad (1)$$

Hereinafter, the CTF value serving as an evaluation value in the main scanning direction B will be referred to as the CTF value in the main scanning direction B, and the CTF value serving as an evaluation value in the sub-scanning direction A will be referred to as the CTF value in the sub-scanning direction A.

In the case where the above-described reference chart shown in FIG. 3A is used, one line of the first ladder chart is read by the document reading portion 2, and the predetermined number of lines of the second ladder chart are read by the document reading portion 2. The above-stated predetermined number is selected to be the number required for obtaining the CTF value in the sub-scanning direction A.

On the basis of the output value of the reading signal outputted form the imaging element 14 when the first ladder chart is read by the document reading portions 2, the image processing portion 5 obtains the CTF value in the main scanning direction B at plural positions in the main scanning direction B. In detail, the image processing portion 5 extracts the maximum value and minimum value of the output value of the reading signal within a predetermined range in the main scanning direction B at various positions in the main scanning direction B, and then uses the above-stated formula (1) to obtain the CTF value in the main scanning direction B. The predetermined range in the main scanning-direction B is selected in consideration of the quantization error, and for example, selected at a range in the length of 10 mm on a document.

Further, on the basis of the output value of the reading signal outputted form the imaging element 14 when the second ladder chart is read by the document reading portion 2, the image processing portion 5 obtains the CTF value in the sub-scanning direction A at plural positions in the main scanning direction B. In detail, the image processing portion 5 extracts the maximum value and minimum value of the output value of the reading signal within a predetermined range in the sub-scanning direction A at various positions in the main scanning direction B, and then uses the above-stated formula (1) to obtain the CTF value in the sub-scanning direction A. The predetermined range in the sub-scanning direction A is selected in consideration of the quantization error, and for example, selected at a range in the length of 10 mm on a document.

In the case where the above-described reference chart shown in Fig. B3 is used, one line of the first ladder chart is read by the document reading portion 2, and one line of the second ladder chart is read by the document reading portion 2.

On the basis of the output value of the reading signal outputted form the imaging element 14 when the first ladder chart is read by the document reading portion 2, the image processing portion 5 obtains the CTF value in the main scanning direction B at plural positions in the main scanning direction B. This CTF value in the main scanning direction B is obtained as in the case of using the above-described reference chart shown in FIG. 3A.

Further, on the basis of the output value of the reading signal outputted form the imaging element 14 when the second ladder chart is read by the document reading portion 2, the image processing portion 5 obtains the CTF value in the sub-scanning direction A at plural positions in the main scanning direction B. In detail, the image processing portion 5 extracts the maximum value and minimum value of the output value of the reading signal within a predetermined range in the sub-scanning direction A at various positions in the main scanning direction B, and then uses the above-stated formula (1) to obtain the CTF value in the sub-scanning direction A. The predetermined range in the main scanning direction B is selected in consideration of the quantization error, and for example, selected at a range in the length of 10 mm on a document.

Figure 5:
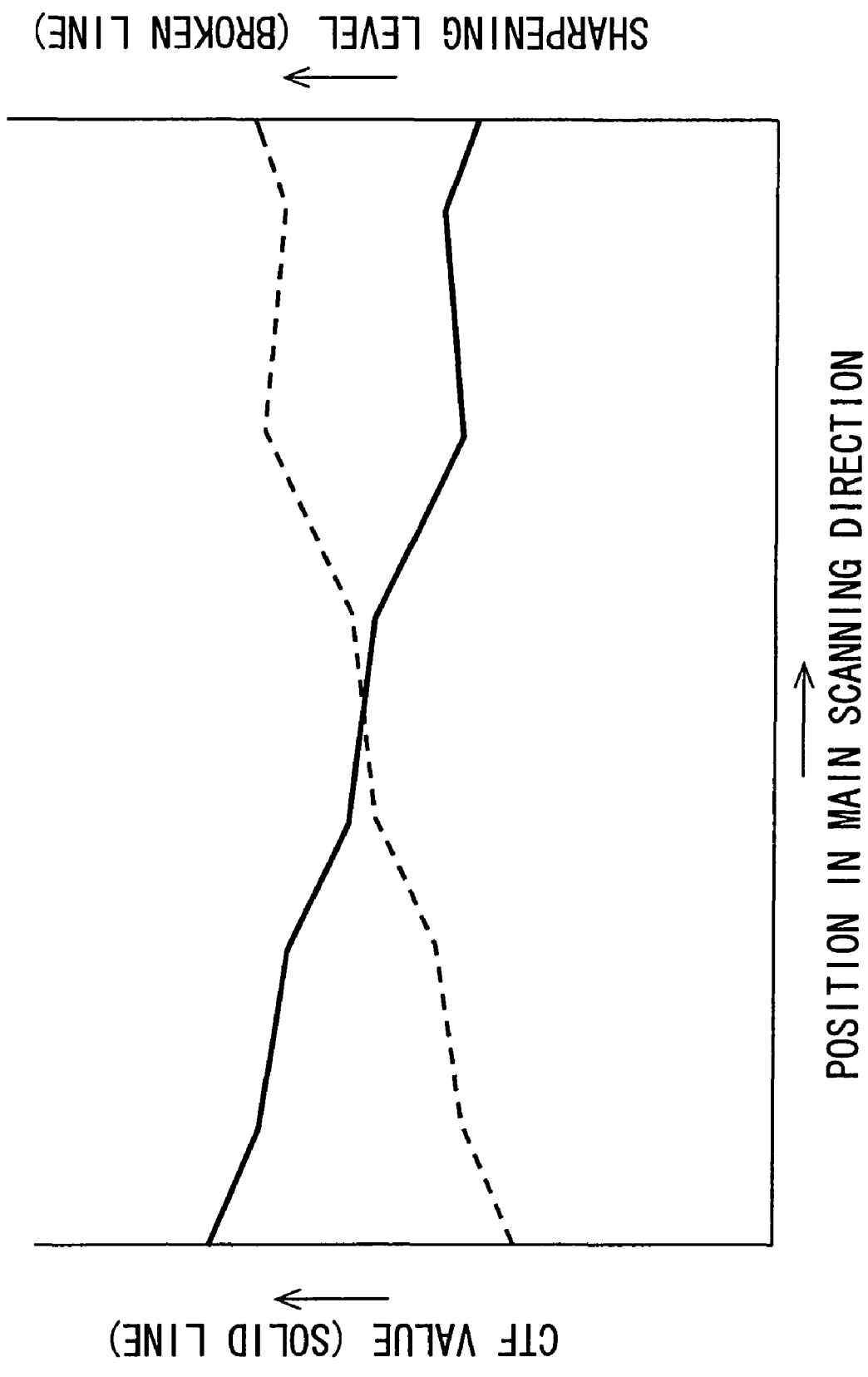
FIG. 5 is a graph showing a CTF value and a sharpening level at various positions in a main scanning direction B at an upstream chart position.
Figure 6:
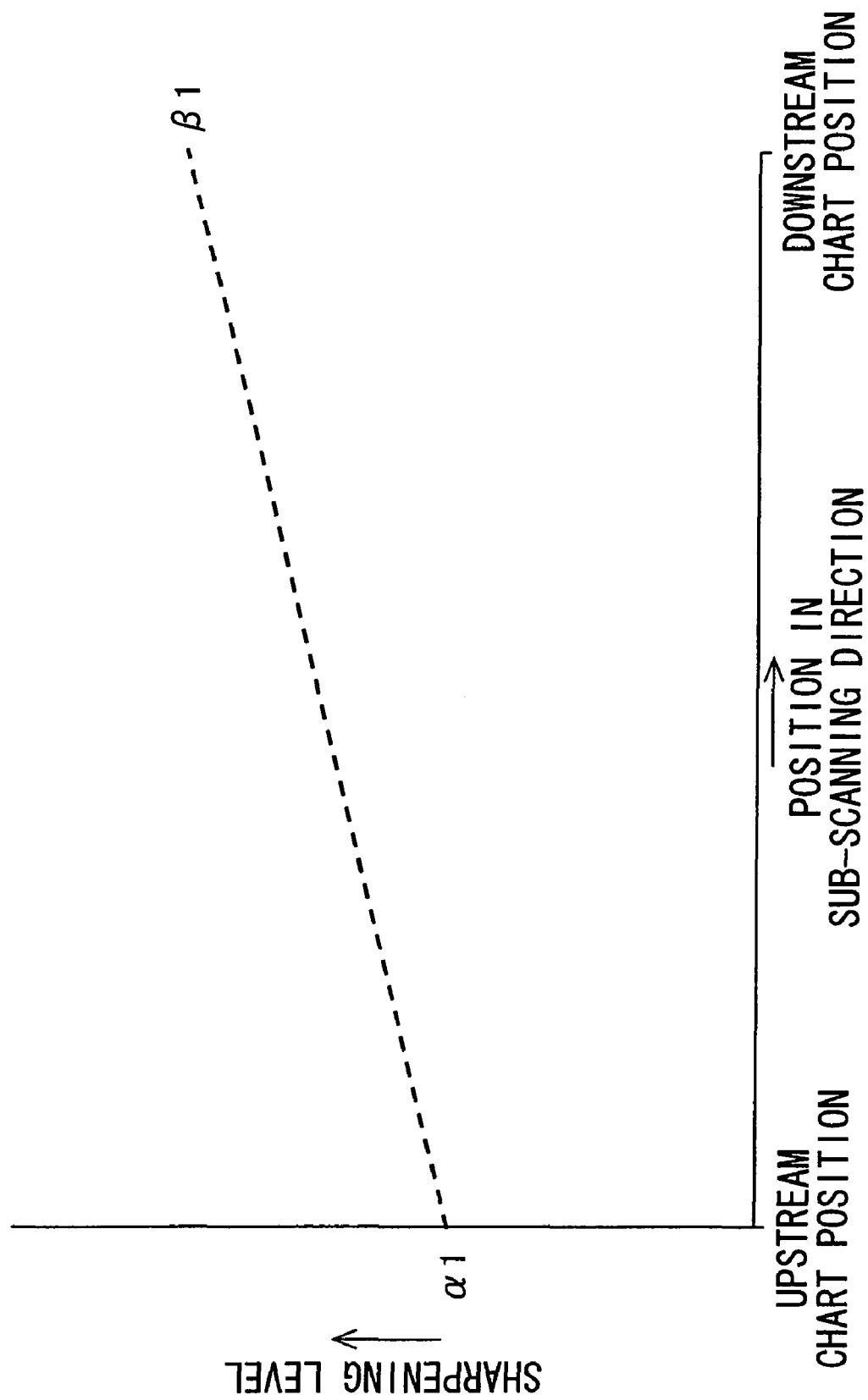
FIG. 6 is a graph showing a sharpening level at various positions in a sub-scanning direction A at an interest position among the various positions in the main scanning direction B.
Figure 7:
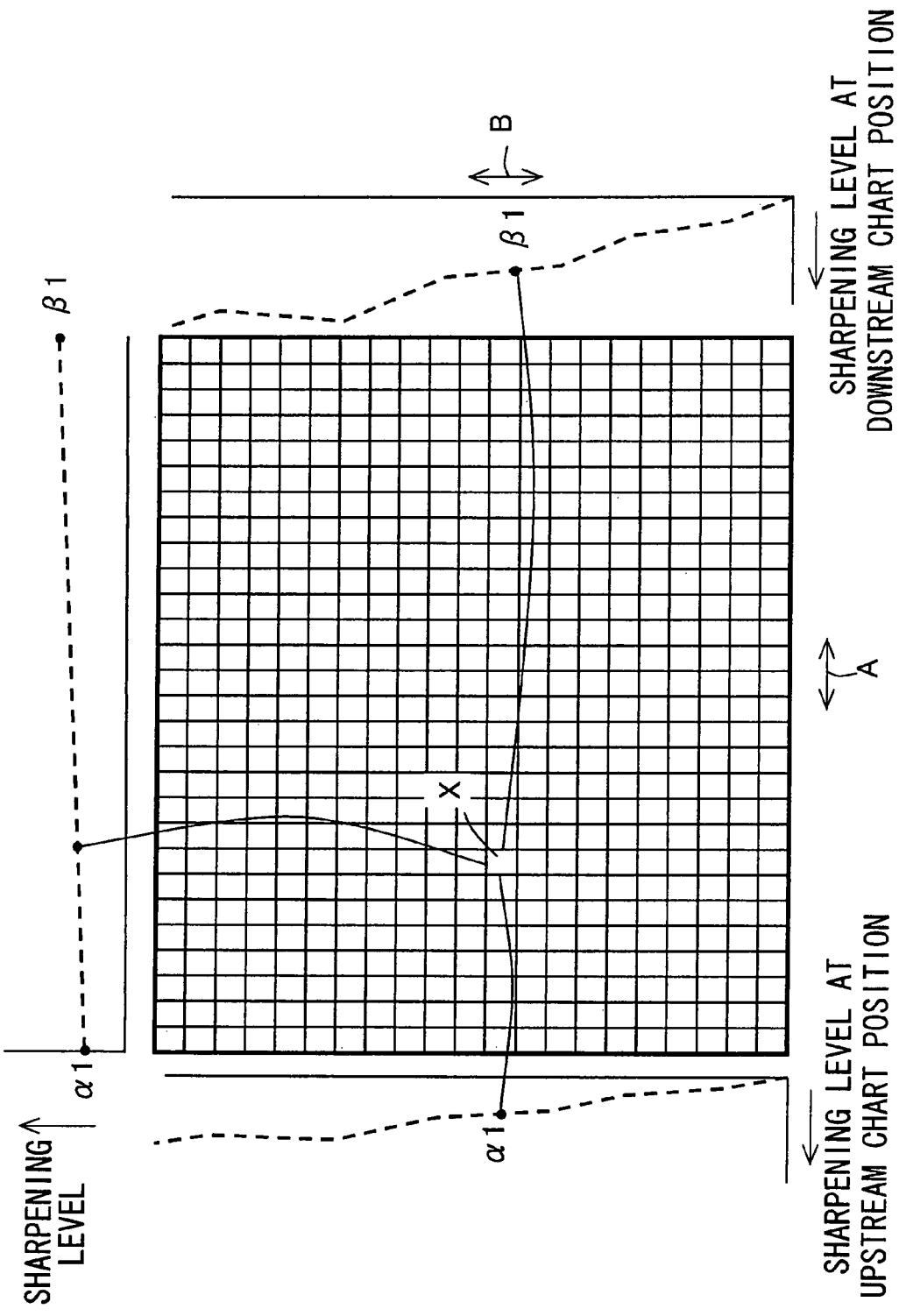
FIG. 7 is a view of assistance in explaining how to obtain the sharpening levels for various image areas in the document image.

With reference to FIGS. 5 to 7, descriptions will be given to how to obtain a sharpening level in the main scanning direction B by using the CTF value in the main scanning direction B. A procedure for obtaining from the CTF value in the main scanning direction B the sharpening level in the main scanning direction B, which represents the correction amount, is similar to a procedure for obtaining from the CTF value in the sub-scanning direction A the sharpening level in the sub-scanning direction A, which represents the correction amount. The descriptions will be thus given only to the former procedure while the descriptions of the latter procedure will be omitted. In FIGS. 5 to 7, "the CTF value in the main scanning direction B" is simply referred to as "CTF value", and "the sharpening level in the main scanning direction B" is simply referred to as "sharpening level".

FIG. 5 is a graph showing the CTF value and the sharpening level at various positions in the main scanning direction B at the upstream chart position. In FIG. 5, a horizontal axis represents the position in the main scanning direction B while a vertical axis represents the CTF value and the sharpening level. The CTF value is shown by a solid line while the sharpening level is shown by a broken line.

The CTF value is different at various positions in the main scanning direction B as shown in FIG. 5, attributable to profile irregularities of the imaging lens 16 and first to third mirrors 17a to 17c and the like causes. The sharpening level at various positions in the main scanning direction B is obtained according to the CTF value. In the embodiment, the sharpening level is the reciprocal number of the CTF value. Such a sharpening level becomes higher as the CTF value decreases.

A graph showing the CTF value and the sharpening level at various positions in the main scanning direction B at the downstream chart position is similar to the graph shown in FIG. 5 and thus omitted. Since the influence of profile irregularities of the second mirror 17b and third mirror 17c is larger as the second mirror 17b and third mirror 17c are closer to the imaging lens 16, the variation in the CTF values among various positions in the main scanning direction B is larger at the downstream chart position compared to that at the upstream chart position.

FIG. 6 is a graph showing a sharpening level at various positions in the sub-scanning direction A at an interest position among the various positions in the main scanning direction B. In FIG. 6, a horizontal axis represents a position in the sub-scanning direction A while a vertical axis represents a sharpening level. The sharpening level is shown by a broken line.

The sharpening level at various positions in the sub-scanning direction A is obtained by the linear interpolation between the sharpening level at the upstream chart position and the sharpening level at the downstream chart position. In other words, the sharpening level at a position located away from the upstream chart position to downstream of the sub-scanning direction A by a distance x is obtained by the following formula (2):

$$\text{Sharpening level} = [(\beta 1 - \alpha 1)/L] \cdot x + \alpha 1 \qquad (2)$$

(wherein the upstream chart position is defined by an origin; L represents a distance between the upstream chart position and the downstream chart position; α1 represents the sharpening level at the upstream chart position; and β1 represents the sharpening level at the downstream chart position.)

The sharpening level is obtained by the linear interpolation in this case, but the measure is not limited to the linear interpolation.

FIG. 7 is a view of assistance in explaining how to obtain the sharpening levels for various image areas in the document image. On the basis of the sharpening level α1 at the upstream chart position and the sharpening level β1 at the downstream chart position at positions in the main scanning direction B in the interest image area X, the image processing portion 5 obtains the sharpening level for the above-mentioned interest image area X as described above. The image processing portion 5 obtains the sharpening levels for respective image areas through the same sort of procedure.

FIGS. 8A to 8H are views each showing a sharpening filter used for sharpening the document image. FIG. 8A generally shows a sharpening filter according to the sharpening level in the main scanning direction B. FIGS. 8B to 8D each shows one example of the sharpening filter shown in FIG. 8A. FIG. 8E generally shows a sharpening filter according to the sharpening level in the sub-scanning direction A. FIGS. 8F to 8H each shows one example of the sharpening filter shown in FIG. 8E. In the embodiment, the sharpening filter according to the sharpening level in the main scanning direction B (hereinafter may be referred to as "a main scanning direction filter") and the sharpening filter according to the sharpening level in the sub-scanning direction A (hereinafter may be referred to as "a sub-scanning direction filter) are selected to each have a 3×3-sized operator. Note that the size of operator of each filter is not limited to 3×3.

With reference to FIG. 8A, in the main scanning direction filter, assuming that S1 represents the sharpening level in the main scanning direction B; a1 represents a weighting factor of the interest pixel; and b1 represents a weighting factor of two pixels surrounding the interest pixel which are located at the same position in the sub-scanning direction A as the interest pixel, a1 is obtained by the following formula (3) while b1 is obtained by the following formula (4):

$$a1 = -2 \cdot b1 + 1 \quad (3)$$

$$b1 = -0.1 \cdot S1 \quad (4)$$

Note that weighting factors of the other pixels than the above-mentioned two pixels among the pixels surrounding the interest pixel are selected at 0.

To take an example, in the case where the CTF value in the main scanning direction B is 23%, the sharpening level in the main scanning direction B is 4.35, and in the main scanning direction filter, the weighting factor of the interest pixel is 1.87 while the weighting factor of the above-mentioned two pixels is −0.43 as shown in FIG. 8B. In the case where the CTF value in the main scanning direction B is 44%, the sharpening level in the main scanning direction B is 2.27, and in the main scanning direction filter, the weighting factor of the interest pixel is 1.45 while the weighting factor of the above-mentioned two pixels is −0.23 as shown in FIG. 8C. In the case where the CTF value in the main scanning direction B is 76%, the sharpening level in the main scanning direction B is 1.32, and in the main scanning direction filter, the weighting factor of the interest pixel is 1.26 while the weighting factor of the above-mentioned two pixels is −0.13 as shown in FIG. 8D.

With reference to FIG. 8E, in the sub-scanning direction filter, assuming that S2 represents the sharpening level in the sub-scanning direction A; a2 represents a weighting factor of the interest pixel; and b2 represents a weighting factor of two pixels surrounding the interest pixel which are located at the same position in the main scanning direction B as the interest pixel, a2 is obtained by the following formula (5) while b2 is obtained by the following formula (6):

$$a2 = -2 \cdot b2 + 1 \quad (5)$$

$$b2 = -0.1 \cdot S2 \quad (6)$$

Note that weighting factors of the other pixels than the above-mentioned two pixels among the pixels surrounding the interest pixel are selected at 0.

To take an example, in the case where the CTF value in the sub-scanning direction A is 23%, the sharpening level in the sub-scanning direction A is 4.35, and in the sub-scanning direction filter, the weighting factor of the interest pixel is 1.87 while the weighting factor of the above-mentioned two pixels is −0.43 as shown in FIG. 8F. In the case where the CTF value in the sub-scanning direction A is 44%, the sharpening level in the sub-scanning direction A is 2.27, and in the sub-scanning direction filter, the weighting factor of the interest pixel is 1.45 while the weighting factor of the above-mentioned two pixels is −0.23 as shown in FIG. 8G. In the case where the CTF value in the sub-scanning direction A is 76%, the sharpening level in the sub-scanning direction A is 1.32, and in the sub-scanning direction filter, the weighting factor of the interest pixel is 1.26 while the weighting factor of the above-mentioned two pixels is −0.13 as shown in FIG. 8H.

The image processing portion 5 sharpens the respective image areas by using the main scanning direction filter, and simultaneously sharpens the respective image areas by using the sub-scanning direction filter. As described above, the processing on the document image allows equalization of quality of the entire document image with ease. To be specific, the out-of-focus image area can be sharpened, resulting in a document image which is clear and sharp overall.

Figure 9:
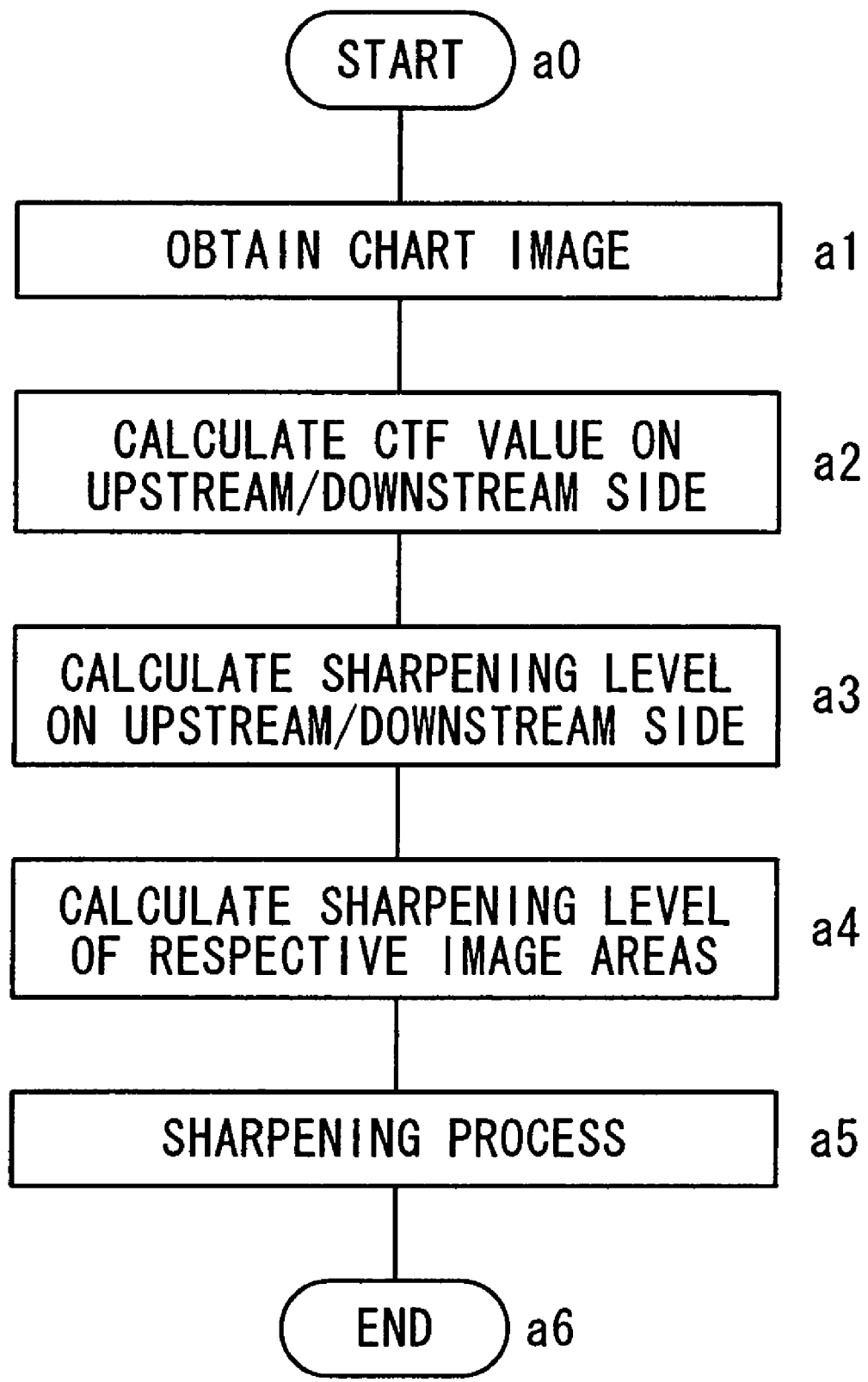
FIG. 9 is a flowchart of assistance in explaining an image processing operation conducted by an image processing portion.

FIG. 9 is a flowchart of assistance in explaining the image processing operation conducted by the image processing portion 5. With reference to FIG. 9, an image processing method will also be explained. The user's operation of inputting an image processing start command will initiate the image processing operation.

Subsequent to the start of the image processing operation, at Step a1, the image processing portion 5 obtains the respective chart images of the first and second chart portions 3 and 4 by using the document reading portion 2 to read the respective reference charts of the first and second chart portions 3 and 4. The process then proceeds to Step a2.

At Step a2, on the basis of the chart image in the first chart portion 3, the image processing portion 5 obtains the CTF value in the main scanning direction B and the CTF value in the sub-scanning direction A at various positions in the main scanning direction B at the upstream chart position. Further, on the basis of the chart image in the second chart portion 4, the image processing portion 5 obtains the CTF value in the main scanning direction B and the CTF value in the sub-scanning direction A at various positions in the main scanning direction B at the downstream chart position. The respective CTF values are thus obtained, and the process then proceeds to Step a3.

At Step a3, the image processing portion 5 obtains, from the CTF value in the main scanning direction B, the sharpening level in the main scanning direction B at various positions in the main scanning direction B at the upstream chart position. Further, the image processing portion 5 obtains, from the CTF value in the sub-scanning direction A, the sharpening level in the sub-scanning direction A at various positions in the main scanning direction B at the upstream chart position. Furthermore, the image processing portion 5 obtains, from the CTF value in the main scanning direction B, the sharpening level in the main scanning direction B at various positions in the main scanning direction B at the downstream chart position. Furthermore, the image processing portion 5 obtains, from the CTF value in the sub-scanning direction A, the sharpening level in the sub-scanning direction A at various positions in the main scanning direction B at the downstream chart position. The respective sharpening levels are thus obtained, and the process then proceeds to Step a4.

At Step a4, on the basis of the sharpening level in the main scanning direction B at various positions in the main scanning direction B at the upstream chart position and the sharpening level in the main scanning direction B at various positions in the main scanning direction B at the downstream chart position, the image processing portion 5 obtains the sharpening level in the main scanning direction B regarding the respective image areas. Further, on the basis of the sharpening level in the sub-scanning direction A at various positions in the main scanning direction B at the upstream chart position and the sharpening level in the sub-scanning direction A at various positions in the main scanning direction B at the downstream chart position, the image processing portion 5 obtains the sharpening level in the sub-scanning direction A regarding the respective image areas. The respective sharpening levels are thus obtained, and the process then proceeds to Step a5.

At Step a5, the image processing portion 5 sharpens the document image by using the sharpening filters in accordance with the sharpening level in the main scanning direction B regarding the respective image areas. Further, the image processing portion 5 sharpens the document image by using the sharpening filters in accordance with the sharpening level in the sub-scanning direction A regarding the respective image areas. The document image has thus its respective image areas sharpened, and the image processing operation is then completed.

The sharpening levels in the respective image areas may be obtained everytime the document is read by the document reading portion 2. However, the sharpening levels need not be necessarily obtained in this way. For example, once obtained sharpening levels for the respective image areas may be stored in the memory portion 6 so that, in the later occasions where a document is read by the document reading portion 2, the sharpening levels for the respective image areas stored in the memory portion 6 are used to process the document image in the read document. This makes it possible to reduce throughput of the image processing portion 5.

Figure 10A:
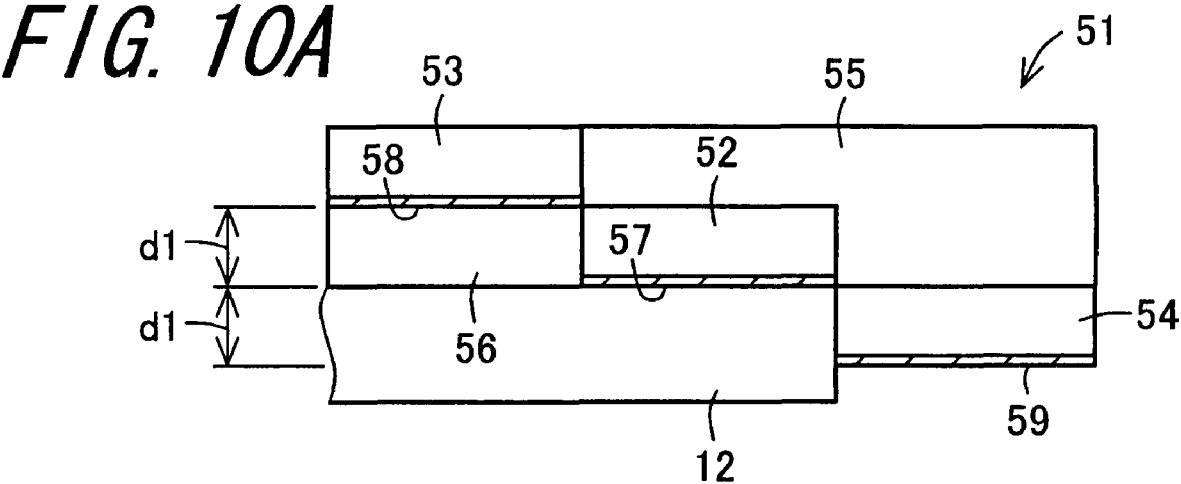
FIGS. 10A and 10B are sectional views each showing a first chart portion included in a document reading apparatus according to a second embodiment of the invention.
Figure 10B:
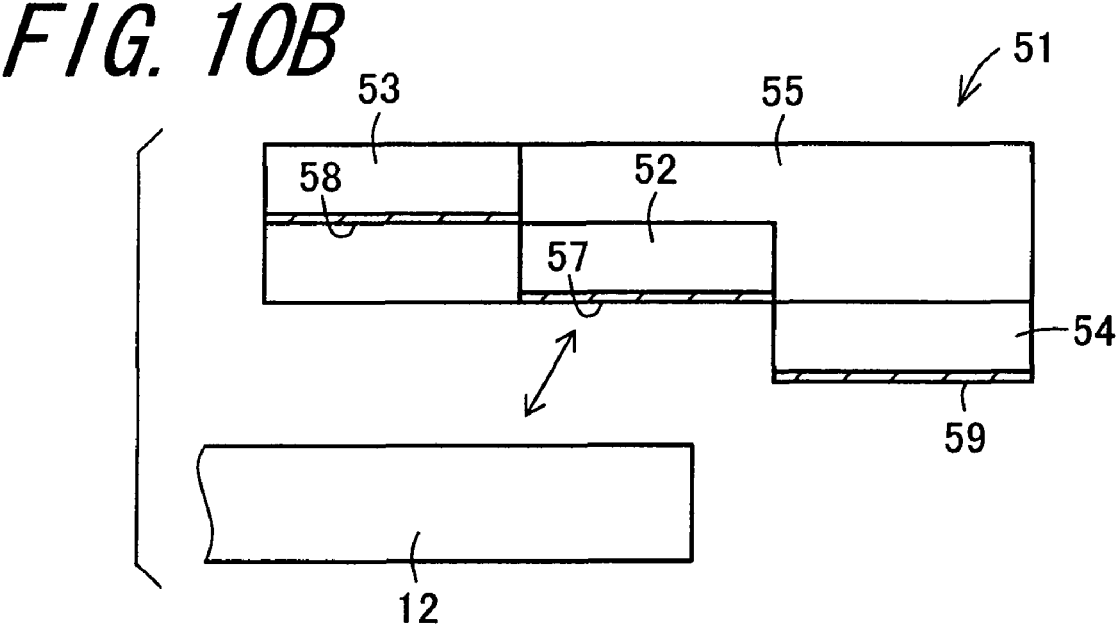

FIGS. 10A and 10B are sectional views each showing a first chart portion 51 included in a document reading apparatus according to a second embodiment of the invention. FIG. 10A shows the first chart portion 51 attached onto the document table 12. FIG. 10B shows the first chart portion 51 which has been removed from the document table 12. Since the document reading apparatus according to the present embodiment is similar to the above-described document reading apparatus 1 according to the first embodiment, descriptions in common therewith will be omitted. The configuration of the second chart portion is the same as the configuration of the first chart portion 51. The descriptions will be thus given only to the first chart portion 51 while the descriptions of the second chart portion will be omitted.

The first chart portion 51 includes a first part 52, a pair of second parts 53 and 54, a coupling part 55 coupled on the first part 52 and respective second parts 53 and 54, and a spacer part 56. The first part 52 and the respective second parts 53 and 54 are plate-like long members. The first part 52 has a first chart-formed surface 57 in which a reference chart is formed, and the respective second parts 53 and 54 have second chart-formed surfaces 58 and 59 in which a reference chart is formed. The first chart-formed surface 57 constitutes one thickness-wise surface of the first part 52, and the respective second chart-formed surfaces 58 and 59 respectively constitute one thickness-wise surface of the respective second parts 53 and 54. In the first chart-formed surface 57 and the respective second chart-formed surfaces 58 and 59, the same reference charts are formed. The reference chart formed in each of the first chart-formed surface 57 and the respective second chart-formed surfaces 58 and 59 may be a reference chart shown in FIG. 3A or a reference chart shown in FIG. 3B.

The first chart portion 51 is provided on the document table 12 so that longitudinal directions of the first part 52 and respective second parts 53 and 54 are parallel to the main scanning direction B. Herein, the descriptions will be given on the assumption that the first chart portion 51 has been attached onto the document table 12. The first chart-formed surface 57 and the respective second chart-formed surfaces 58 and 59 are parallel to the document placement surface 11. The first chart-formed surface 57 abuts on the document placement surface 11. The respective second chart-formed surfaces 58 and 59 are disposed on both sides of the document placement surface 11 so that the second chart-formed surface 58 and the document placement surface 11 are spaced away from each other by a distance d1 which is as long as a distance between the second chart-formed surface 59 and the document placement surface 11. The spacer part 56 is a light-transmitting member. The spacer part 56 is interposed between the document placement surface 11 and the second chart-formed surface 58 which is disposed face-to-face with the document placement surface 11, selected among the respective second chart forming faces 58 and 59. This makes it possible to maintain a constant distance between the above-stated second chart-formed surface 58 and the document placement surface 11. The first chart portion 51 is detachably provided on the document table 12.

The first chart-formed surface 57 is used to obtain the CTF value and then obtain the sharpening level based on the CTF value. The respective second chart-formed surfaces 58 and 59 are used to determine a direction in which the document-side focused focal position is shifted relative to the document position.

With reference to FIGS. 11A to 11C, FIG. 12, and FIGS. 13A and 13B, descriptions will be given to how to obtain the sharpening level in the main scanning direction B from the CTF value in the main scanning direction B. A procedure for obtaining from the CTF value in the main scanning direction B the sharpening level in the main scanning direction B, which represents the correction amount, is similar to a procedure for obtaining from the CTF value in the sub-scanning direction A the sharpening level in the sub-scanning direction A, which represents the correction amount. The descriptions will be thus given only to the former procedure while the descriptions of the latter procedure will be omitted. In FIGS. 11A to 11C, FIG. 12, and FIGS. 13A and 13B, "the CTF value in the main scanning direction B" is simply referred to as "the CTF value", and "the sharpening level in the main scanning direction B" is simply referred to as "the sharpening level".

Figure 11A:
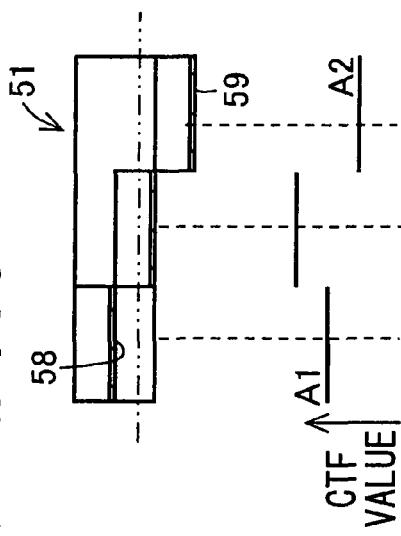
FIGS. 11A to 11C are views of assistance in explaining the relationship between a document-side focused focal position and respective CTF values for a first chart-formed surface and respective second chart-formed surfaces.
Figure 11B:
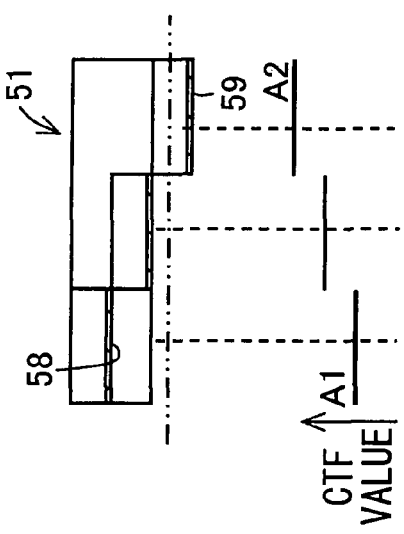
Figure 11C:
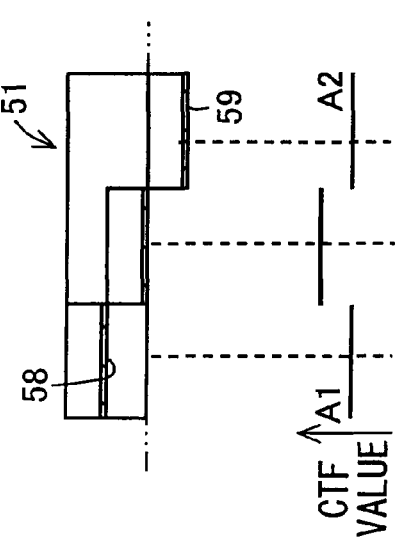

FIGS. 11A to 11C are views of assistance in explaining the relationship between the document-side focused focal position and the respective CTF values for the first chart-formed surface 57 and respective second chart-formed surfaces 58 and 59. FIG. 11A shows the case where the document-side focused focal position corresponds with the position of the first chart-formed surface 57. FIG. 11B shows the case where the document-side focused focal position is shifted toward the imaging element 14 when seen from the first-chart-formed surface 57. FIG. 11C shows the case where the document-side focused focal position is shifted in a direction from the first chart-formed surface 57 which direction is opposite to a direction in which the imaging element 14 is located. The position of the first chart-formed surface 57 corresponds to the document position.

The CTF value for the one second chart-formed surface 58 is defined by A1 while the CTF value for the other second chart-formed surface 59 is defined by A2. In the case where the document-side focused focal position corresponds to the first chart-formed surface 57, A1=A2 is satisfied as shown in FIG. 11A. In the case where the document-side focused focal position is shifted toward the imaging element 14 when seen from the first chart-formed surface 57, A1<A2 is satisfied as shown in FIG. 11B. In the case where the document-side focused focal position is shifted in the direction from the first chart-formed surface 57 which direction is opposite to the direction in which the imaging element 14 is located, A1>A2 is satisfied as shown in FIG. 11C.

FIG. 12 is a graph showing a shift of the document-side focused focal position relative to the document position at various positions in the sub-scanning direction A. A solid line 61 represents the document position. A solid line 62 represents the state where the document-side focused focal position corresponds to the document position at the upstream chart position, and from the upstream chart position toward the downstream chart position, the document-side focused focal position is shifted to a larger extent in the direction from the document position which direction is opposite to the direction in which the imaging element 14 is located. A solid line 63 represents the state where the document-side focused focal position corresponds to the document position at the upstream chart position, and from the upstream chart position toward the downstream chart position, the document-side focused focal position is shifted to a larger extent toward the imaging element 14 relative to the document position. A solid line 64 represents the state where the document-side focused focal position is shifted toward the imaging element 14 relative to the document position at the upstream chart position, and on the way from the upstream chart position toward the downstream chart position, the document-side focused focal position corresponds to the document position, and at the downstream chart position, the document-side focused focal position is shifted in the direction from the document position which direction is opposite to the direction in which the imaging element 14 is located.

Figure 13A:
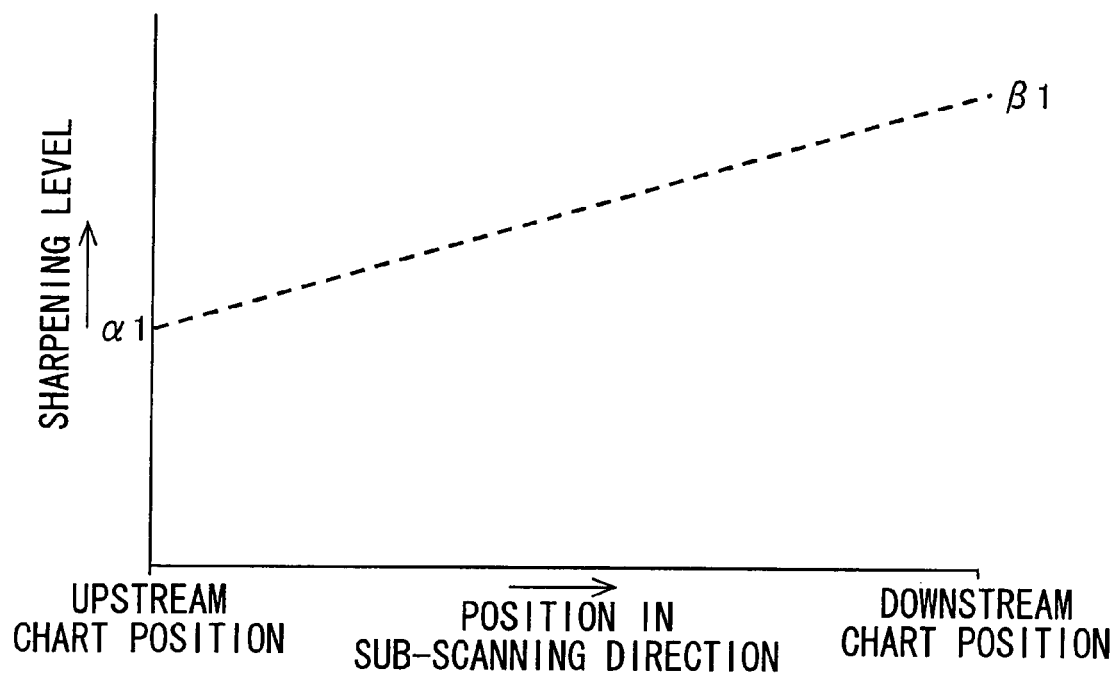
FIGS. 13A and 13B are graphs each showing sharpening levels at various positions in the sub-scanning direction A at an interest position among the various positions in the main scanning direction B.
Figure 13B:
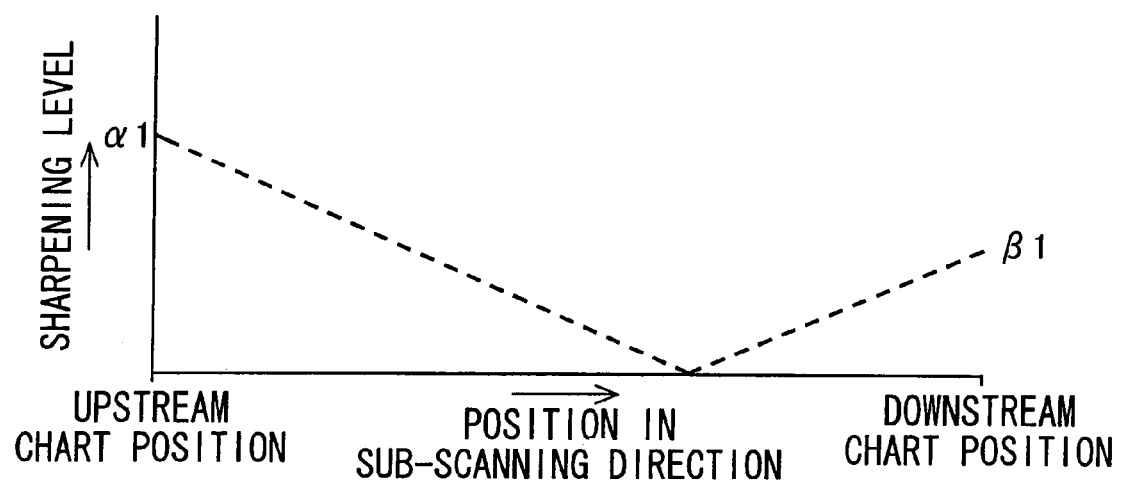

FIGS. 13A and 13B are graphs each showing sharpening levels at various positions in the sub-scanning direction A at an interest position among the various positions in the main scanning direction B. FIG. 13A shows the case where a shift direction of the document-side focused focal position at the upstream chart position is the same as that of the document-side focused focal position at the downstream chart position. FIG. 13B shows the case where the shift direction of the document-side focused focal position at the upstream chart position is opposite to that of the document-side focused focal position at the downstream chart position. In FIGS. 13A and 13B, a horizontal axis represents the position in the sub-scanning direction A while a vertical axis represents the sharpening level. The sharpening level is shown by a broken line.

In the embodiment, when A1=A2 is satisfied at least one of the upstream chart position and the downstream chart position, for example, in the above-described states shown by the solid lines 62 and 63 in FIG. 12, the image processing portion 5 obtains the sharpening levels at various positions in the sub-scanning direction A by using the above-stated formula (2) according to the first embodiment. In this case, a graph as shown in FIG. 13A is obtained. Further, the same result is obtained also when A1>A2 is satisfied at both of the upstream chart position and the downstream chart position. Furthermore, the same result is obtained also when A1<A2 is satisfied at both of the upstream chart position and the downstream chart position.

Further, in the embodiment, when A1>A2 is satisfied at one of the upstream chart position and the downstream chart position while A1<A2 is satisfied at the other one of the upstream chart position and the downstream chart position, for example, in the state shown by the solid line 64 in FIG. 12, the image processing portion 5 obtains the sharpening levels at various positions in the sub-scanning direction A by using the following formula (7) and the following formula (8). In this case, a graph as shown in FIG. 13B is obtained, where the sharpening level will become 1 at an intermediate position between the upstream chart position and the downstream chart position.

In the case of $0 \leq x \leq \{(\alpha1-1)/(\alpha1+\beta1-2)\} \cdot L$, $$\text{Sharpening level} = -\{(\alpha1+\beta1-2)/L\} \cdot x + \alpha1 \quad (7)$$

In the case of $\{(\alpha1-1)/(\alpha1+\beta1-2)\} \cdot L < x \leq L$, $$\text{Sharpening level} = \{(\alpha1+\beta1-2)/L\} \cdot x - (\alpha1-2) \quad (8)$$

In such an embodiment, even in the case where the document-side focused focal position at the upstream chart position and the document-side focused focal position at the downstream chart position are shifted so as to be located on either side of the document position, and the document-side focused focal position and the document position correspond to each other at an intermediate position between the upstream chart position and the downstream chart position, the quality of the document image can be equalized overall. In other words, it is possible to prevent a trouble such that the image is undesirably sharpened despite the state in focus where the document-side focused focal position and the document position correspond to each other at the intermediate position between the upstream chart position and the downstream chart position.

Figure 14:
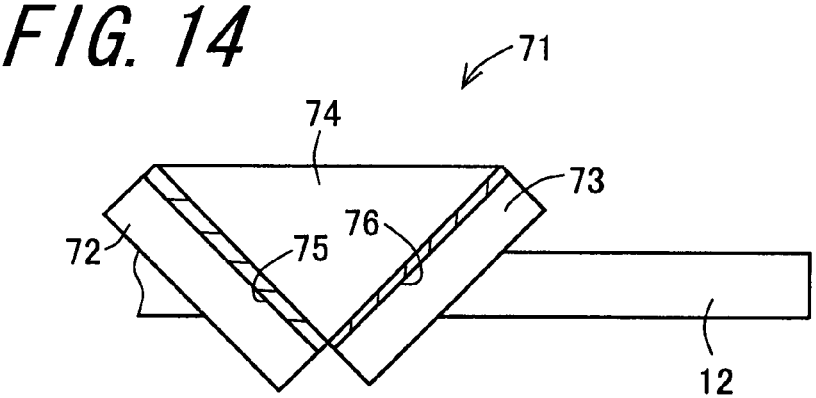
FIG. 14 is a sectional view showing a first chart portion included in a document reading apparatus according to a third embodiment of the invention.

FIG. 14 is a sectional view showing a first chart portion 71 included in a document reading apparatus according to a third embodiment of the invention. Since the document reading apparatus according to the present embodiment is similar to the above-described document reading apparatus 1 according to the first and second embodiments, descriptions in common therewith will be omitted. The configuration of the second chart portion is the same as the configuration of the first chart portion 71. The descriptions will be thus given only to the first chart portion 71 while the descriptions of the second chart portion will be omitted.

The first chart portion 71 includes a first part 72, a second part 73, and a coupling part 74 for coupling the first part 72 and the second part 73 onto each other. The first part 72 and the second part 73 are plate-like long members. The first part 72 has a first chart-formed surface 75 in which a reference chart is formed, and the second part 73 has a second chart-formed surfaces 76 in which a reference chart is formed. The first chart-formed surface 75 constitutes one thickness-wise surface of the first part 72, and the second chart-formed surfaces 76 constitutes one thickness-wise surface of the second part 73. In the first chart-formed surface 75 is formed the first ladder chart shown in FIG. 3B, and in the second chart-formed surface 76 is formed the second ladder chart shown in FIG. 3B.

The first chart portion 71 is provided on the document table 12 so that longitudinal directions of the first part 72 and second part 73 are parallel to the main scanning direction B. Herein, the descriptions will be given on the assumption that the first chart portion 71 has been attached onto the document table 12. The first chart-formed surface 75 and the second chart-formed surface 76 are inclined to the document placement surface 11 and protrude from the document placement surface 11 to both sides of the document placement surface 11.

Figure 15:
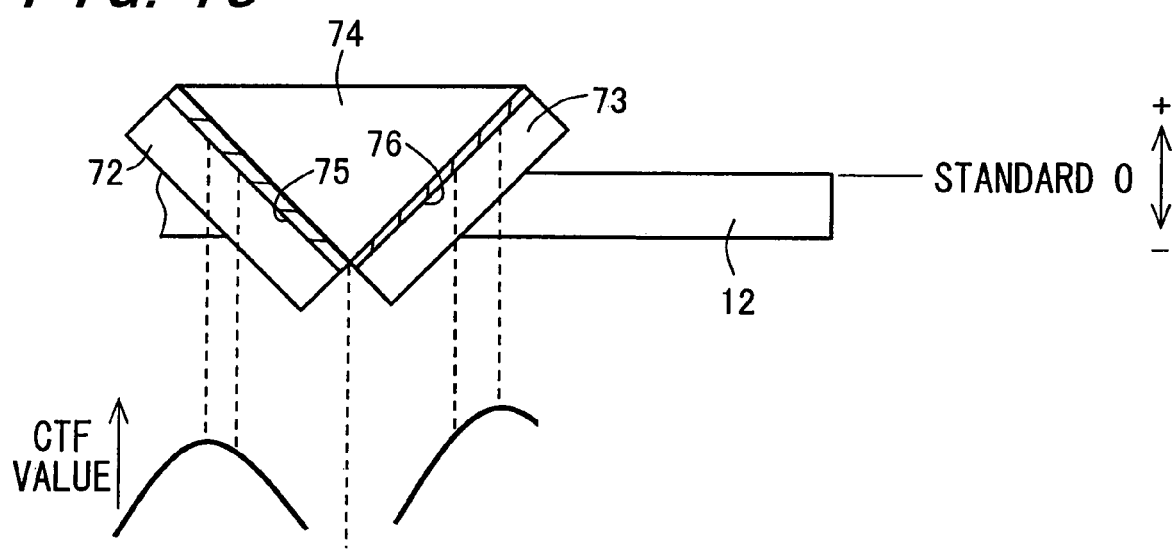
FIG. 15 is a view of assistance in explaining the relationship between a document-side focused focal position and respective CTF values for first and second chart-formed surfaces.

FIG. 15 is a view of assistance in explaining the relationship between the document-side focused focal position and the respective CTF values for the first chart-formed surface 75 and second chart-formed surface 76. The first chart portion 71 is read by the image reading portion as the reading position is made to move in the reading direction A1. On the basis of the chart image in the first chart portion 71 read by the image reading portion, the image processing portion 5 obtains the CTF value. The CTF value changes depending on the position in the sub-scanning direction A as shown in FIG. 15.

In the embodiment, the change of the CTF value can be used to determine a direction in which the document-side focused focal position is shifted relative to the document placement surface 11. In the example shown in FIG. 15, regarding the first chart-formed surface 75; a position where the maximum CTF value is obtained, is shifted to left when seen from a sub-scanning direction A-wise center position of the first chart-formed surface 75, thus resulting in such a determination that, with respect to the main scanning direction B, the document-side focused focal position is shifted in the direction from the document placement surface 11 which direction is opposite to the direction in which the imaging element 14 is located. Further, regarding the second chart-formed surface 76, a position where the maximum CTF value is obtained, is shifted to right when seen from a sub-scanning direction A-wise center position of the second chart-formed surface 76, thus resulting in such a determination that, with respect to the sub-scanning direction A, the document-side focused focal position is shifted to the direction from the document placement surface 11 which direction is opposite to the direction in which the imaging element 14 is located. According to the embodiment as just described, it is possible to achieve the same sort of the effects obtained according to the above-described second embodiment.

Figure 16:
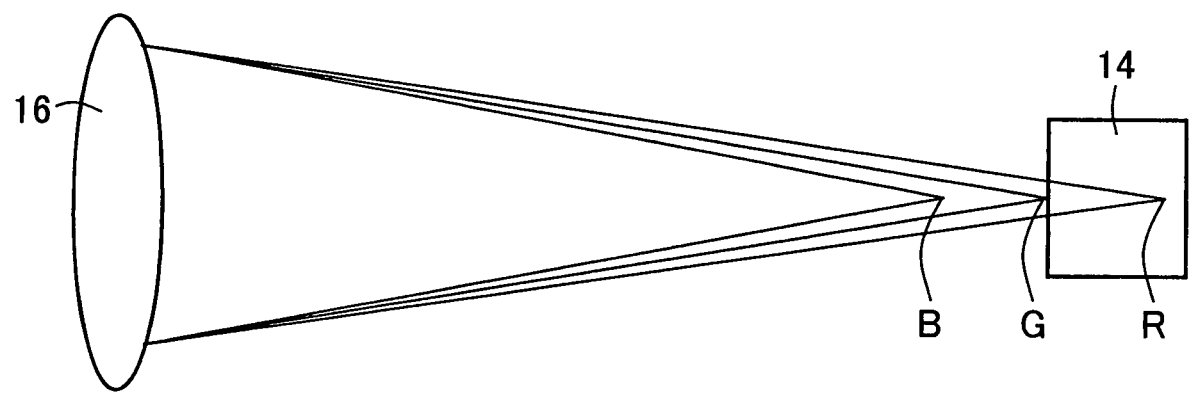
FIG. 16 is a view of assistance in explaining out-of-focus caused by the chromatic aberration.

Although the out-of-focus caused by the chromatic aberration is not taken into consideration in the above-described first to third embodiments, the out-of-focus caused by the chromatic aberration is also taken into consideration in a fourth embodiment of the invention. FIG. 16 is a view of assistance in explaining out-of-focus caused by the chromatic aberration. The imaging element 14-side focused focal position is different from color to color among respective colors of red (R), green (G), and blue (B) which come closer to the imaging lens 16 in the order of red, green, and blue. Such differences of the imaging element 14-side focused focal position among the respective colors will cause a color to arise on a frame of black character. In order to solve this problem, in the embodiment, the document reading portion 2 reads the document separately from one color to another among the respective colors of red, green, and blue, and the image processing portion 5 processes the document image separately from one color to another among the respective colors. According to the embodiment as described above, the quality of the document image can be equalized overall even with the chromatic aberration.

In the above-described first to fourth embodiments, the CTF value is used to obtain the sharpening level based on which the respective image areas are sharpened through the filtering process. On the other hand, in a fifth embodiment, the CTF value is used to obtain a smoothing level based on which the respective image areas are smoothened through the filtering process. The smaller the CTF value is, the lower the smoothing level is. According to the embodiment as just described, the image area in focus can be smoothened to thus obtain a document image which is smooth overall.

Figure 17:
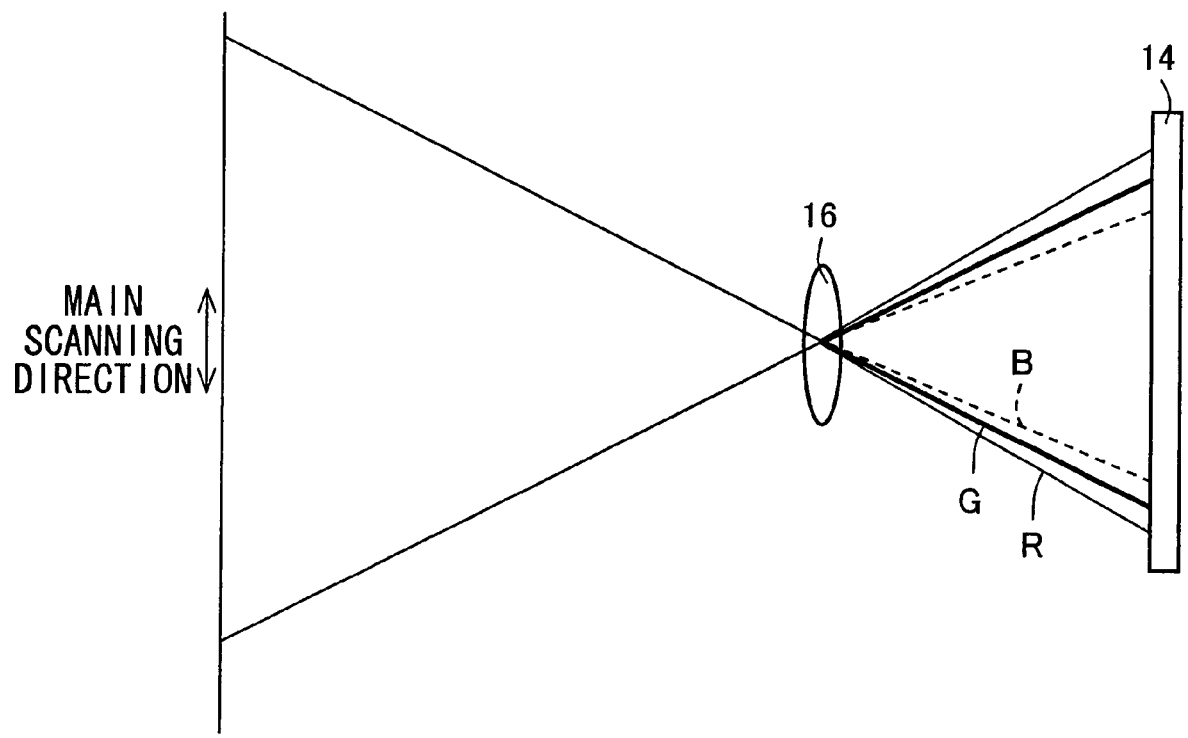
FIG. 17 is a view of assistance in explaining a color shift caused by the chromatic aberration.

In a sixth embodiment of the invention, the color shift caused by the chromatic aberration is taken into consideration. FIG. 17 is a view of assistance in explaining the color shift caused by the chromatic aberration. The color shift means that the positions of the document image of the respective colors are relatively shifted to each other. The position of the document image is different from color to color among red, green, and blue, by the chromatic aberration.

Since the document reading apparatus according to the present embodiment is similar to the above-described document reading apparatus 1 according to the first embodiment, descriptions in common therewith will be omitted. In the embodiment, the document reading portion 2 reads the document separately from one color to another among the respective colors of red, green, and blue, and the image processing portion 5 processes the document image from one color to another. In the respective chart-formed surfaces of the first and second chart portions 3 and 4, the first ladder chart shown in FIG. 3A is formed as the reference chart.

Figure 18:
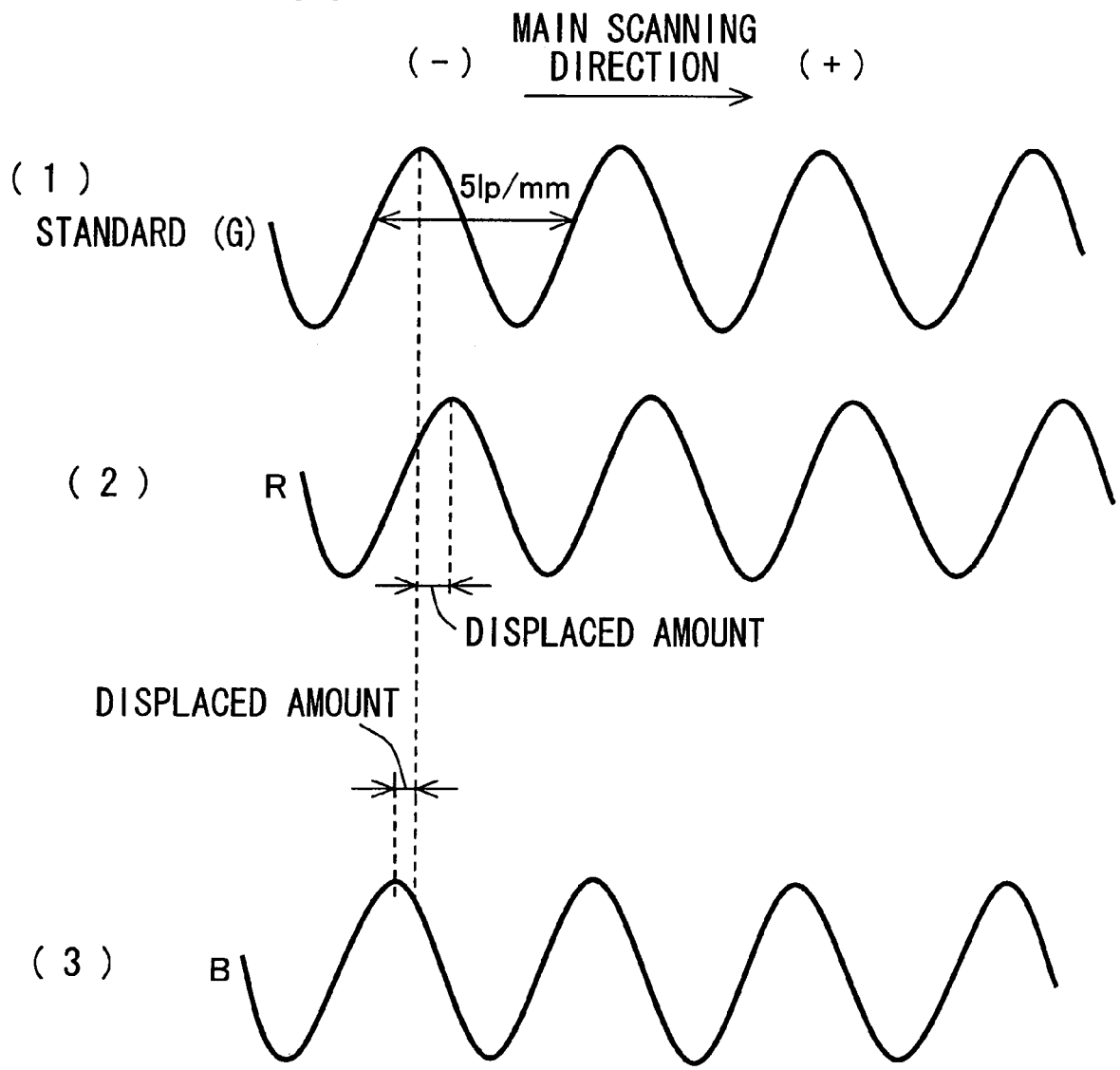
FIG. 18 is a view showing a waveform of a reading signal taken from the reference chart.

FIG. 18 is a view showing a waveform of a reading signal taken from the reference chart. FIG. 18(1) shows a waveform of a green component of the reading signal. FIG. 18(2) shows a waveform of a red component of the reading signal. FIG. 18(3) shows a waveform of a blue component of the reading signal. In FIGS. 18(1) to 18(3), a horizontal axis represents the position in the main scanning direction B while a vertical axis represents the output value of the reading signal.

When the reference chart is read by the document reading portion 2, the output value of the reading signal outputted from the imaging element 14 changes depending on the position in the main scanning direction B. The red component, the green component, and the blue component are displaced in the main scanning direction B as shown in FIG. 18 by the chromatic aberration.

On the basis of the chart image of the first chart portion 3 obtained from the reference chart of the first chart portion 3 read by the document reading portion 2, the image processing portion 5 obtains a displacement amount of the red component relative to the green component and a displacement amount of the blue component relative to the green component at plural positions in the main scanning direction B at the upstream chart position. Further, on the basis of the chart image of the second chart portion 4 obtained from the reference chart of the second chart portion 4 read by the document reading portion 2, the image processing portion 5 obtains a displacement amount of the red component relative to the green component and a displacement amount of the blue component relative to the green component at plural positions in the main scanning direction B at the downstream chart position.

The displacement amount of the red component relative to the green component corresponds to the displacement amount of an image of red color relative to an image of green color. The displacement amount of the blue component relative to the green component corresponds to the displacement amount of an image of blue color relative to an image of green color. Hereinafter, the image of red color will be referred to as the red image, the image of green color will be referred to as the green image, and the image of blue color will be referred to as the blue image.

Figure 19:
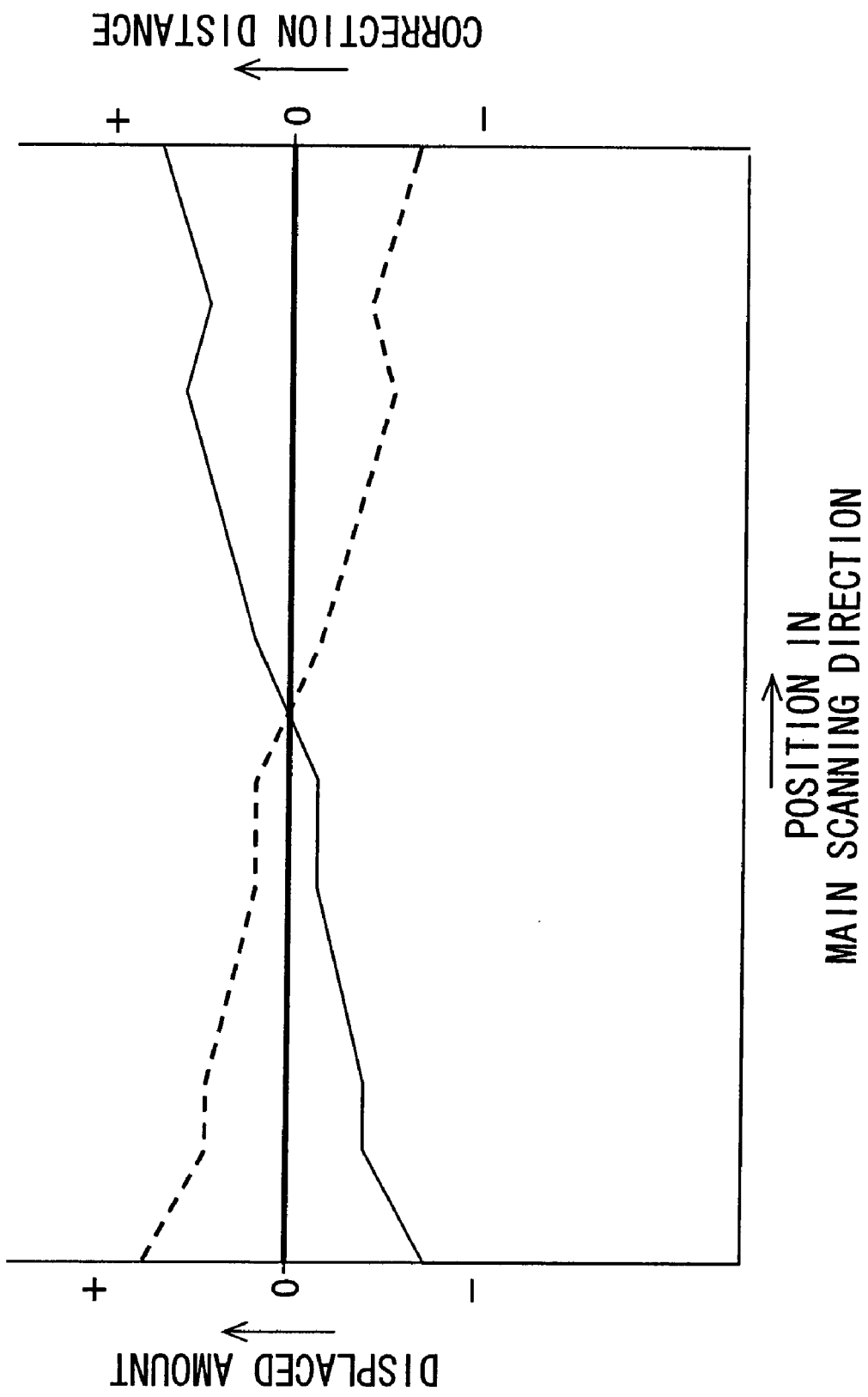
FIG. 19 is a graph showing a displacement amount of a red image relative to a green image, and a correction distance for the red image, at various positions in the main scanning direction B at the upstream chart position.
Figure 20:
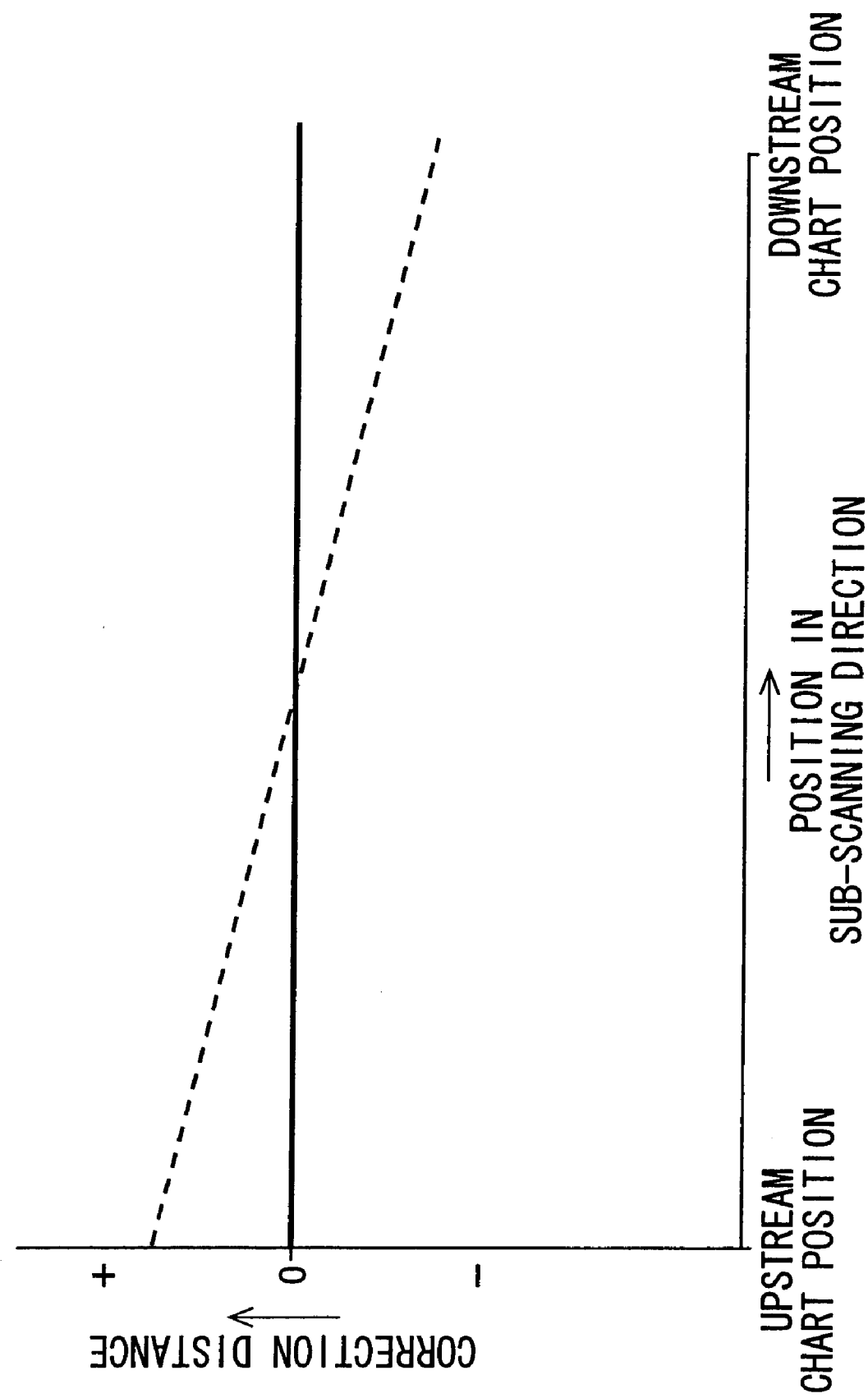
FIG. 20 is a graph showing the correction distance for the red image at various positions in the sub-scanning direction A at the interest position among the various positions in the main scanning direction B.
Figure 21:
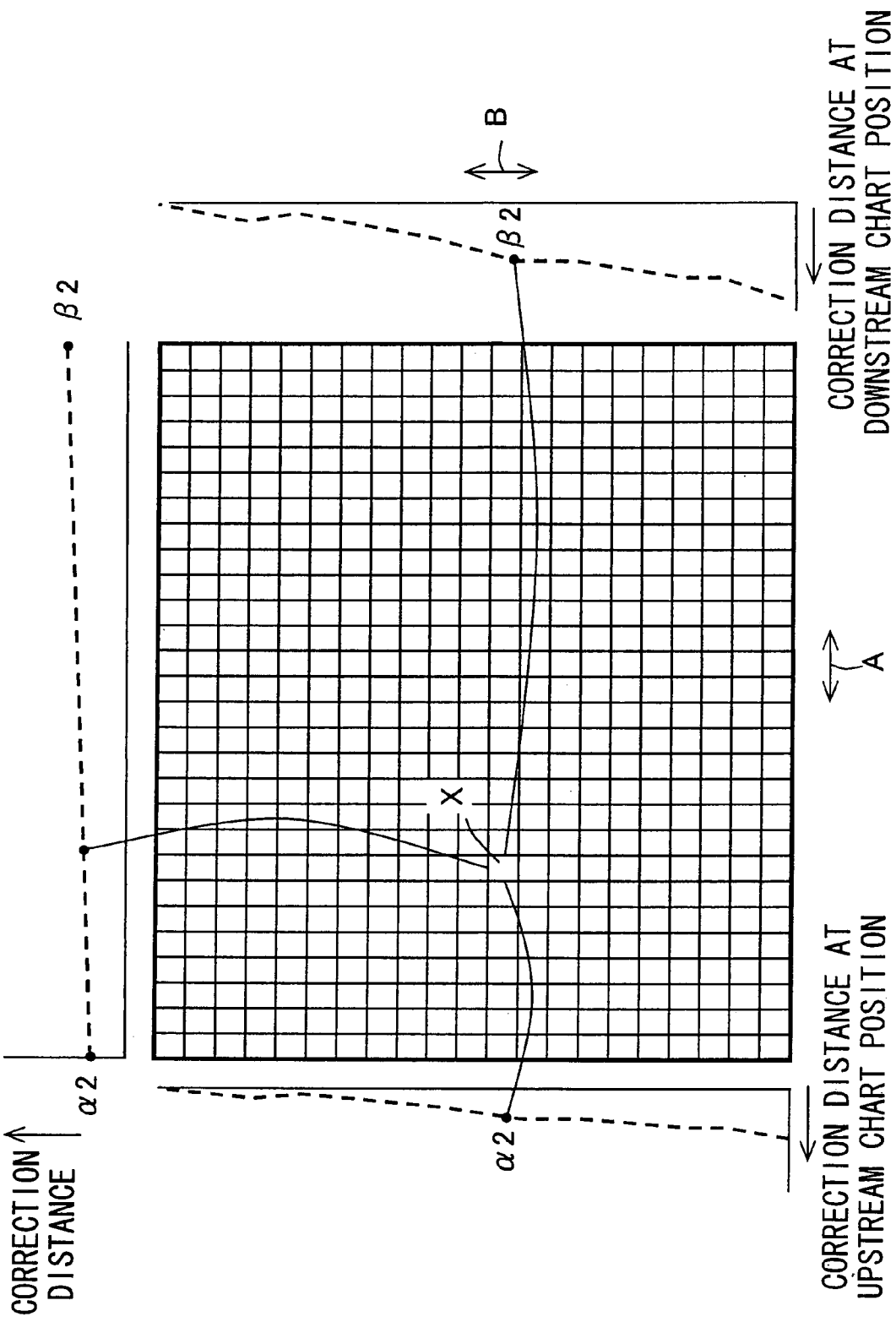
FIG. 21 is a view of assistance in explaining how to obtain the correction distance for various image areas of the red image.

With reference to FIGS. 19 to 21, descriptions will be given to how to obtain a correction distance for the red image by using the distanced amount of the red image relative to the green image. A procedure for obtaining from the distanced amount of the red image relative to the green image the correction distance for the red image, which represents the correction amount, is similar to a procedure for obtaining from the distanced amount of the blue image relative to the green image the correction distance for the blue image, which represents the correction amount. The descriptions will be thus given only to the former procedure while the descriptions of the latter procedure will be omitted.

FIG. 19 is a graph showing the displacement amount of the red image relative to the green image, and the correction distance for the red image, at various positions in the main scanning direction B at the upstream chart position. In FIG. 19, a horizontal axis represents the position in the main scanning direction B while a vertical axis represents the displacement amount and the correction distance. The position of the green image acting as a criterion is shown by a thick solid line, the displacement amount of the red image relative to the green image is shown by a thin solid line, and the correction distance for the red image is shown by a broken line. The correction distance is obtained according to the displacement amount. An absolute value of the correction distance is the same as that of the displacement amount while plus and minus of the correction distance is opposite to that of the displacement amount.

A graph showing the displacement amount of the red image relative to the green image, and the correction distance for the red image, at various positions in the main scanning direction B at the downstream chart position, will be drawn also as shown in FIG. 19 and therefore omitted. Since the influence of profile irregularities of the second mirror 17b and third mirror 17c is larger as the second mirror 17b and third mirror 17c are closer to the imaging lens 16, the variation in the displacement amount among various positions in the main scanning direction B is larger at the downstream chart position compared to that at the upstream chart position.

FIG. 20 is a graph showing the correction distance for the red image at various positions in the sub-scanning direction A at the interest position among the various positions in the main scanning direction B. In FIG. 20, a horizontal axis represents the position in the sub-scanning direction A while a vertical axis represents the correction distance. The position of the green image acting as a criterion is shown by a thick solid line, and the correction distance for the red image is shown by a broken line.

The correction distance at various positions in the sub-scanning direction A is obtained by the linear interpolation between the correction distance at the upstream chart position and the correction distance at the downstream chart position. In other words, the correction distance at a position located away from the upstream chart position to downstream of the sub-scanning direction A by a distance x is obtained by the following formula (9):

$$\text{Correction distance} = [(\beta 2 - \alpha 2)/L] \cdot x + \alpha 2 \qquad (9)$$

(wherein the upstream chart position is defined by an origin; L represents a distance between the upstream chart position and the downstream chart position; $\alpha 2$ represents the correction distance at the upstream chart position; and $\beta 2$ represents the correction distance at the downstream chart position.)

FIG. 21 is a view of assistance in explaining how to obtain the correction distance for various image areas of the red image. On the basis of the correction distance at the upstream chart position and the correction distance at the downstream chart position at the position in the main scanning direction B of the interest image area X, the image processing portion 5 obtains the correction distance for the above-stated interest image area X as described above. In the same manner, the image processing portion 5 obtains the correction distance for the respective image areas.

On the basis of the correction distance obtained as described above, the image processing portion 5 moves the red image relative to the green image. In the same manner, the image processing portion 5 also obtains the correction distance for the blue image and, based on the correction distance, moves the blue image relative to the green image. This makes it possible to eliminate the color shift caused by the chromatic aberration, whereby the quality of the document image can be equalized overall.

Figure 22:
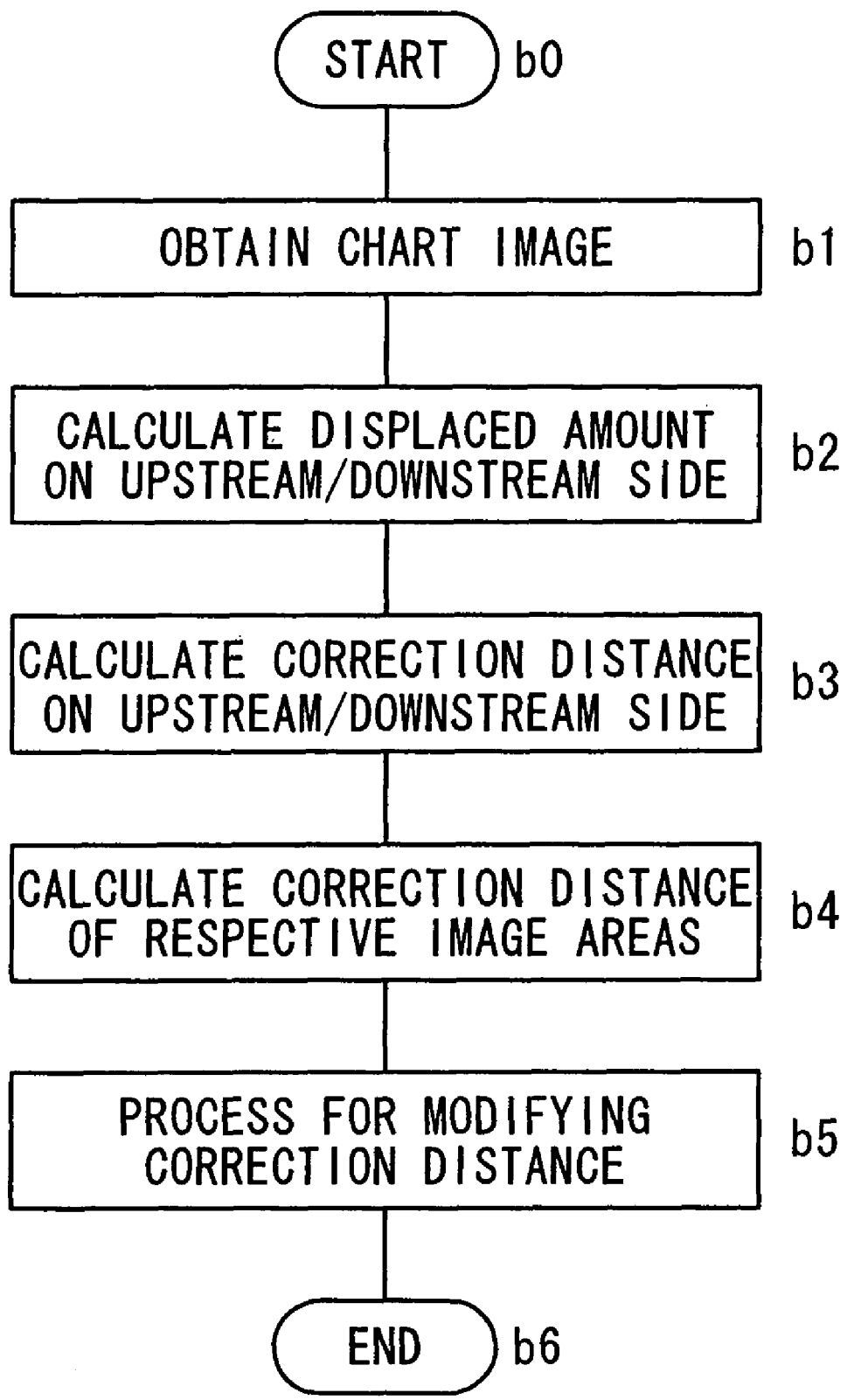
FIG. 22 is a flowchart of assistance in explaining the image processing operation of the image processing portion.

FIG. 22 is a flowchart of assistance in explaining the image processing operation of the image processing portion 5. With reference to FIG. 22, the image processing method will also be explained. The user's operation of inputting an image processing start command will initiate the image processing operation.

Subsequent to the start of the image processing operation, at Step b1, the image processing portion 5 obtains the respective chart images of the first and second chart portion 3 and 4 by using the document reading portion 2 to read the respective reference charts of the first and second chart portions 3 and 4. The process then proceeds to Step b2.

At Step b2, on the basis of the chart image in the first chart portion 3, the image processing portion 5 obtains the displacement amount of the red image relative to the green image and the displacement amount of the blue image relative to the green image at various positions in the main scanning direction B at the upstream chart position. Further, on the basis of the chart image in the second chart portion 4, the image processing portion 5 obtains the displacement amount of the red image relative to the green image and the displacement amount of the blue image relative to the green image at various positions in the main scanning direction B at the downstream chart position. The respective displacement amounts are thus obtained, and the process then proceeds to Step b3.

At Step b3, the image processing portion 5 obtains, from the displacement amount of the red image relative to the green image, the correction distance for the red image at various positions in the main scanning direction B at the upstream chart position. Further, the image processing portion 5 obtains, from the displacement amount of the blue image relative to the green image, the correction distance for the blue image at various positions in the main scanning direction B at the upstream chart position. Furthermore, the image processing portion 5 obtains, from displacement amount of the red image relative to the green image, the correction distance for the red image at various positions in the main scanning direction B at the downstream chart position. Furthermore, the image processing portion 5 obtains, from the displacement amount of the blue image relative to the green image, the correction distance for the blue image at various positions in the main scanning direction B at the downstream chart position. The respective correction distances are thus obtained, and the process then proceeds to Step b4.

At Step b4, on the basis of the correction distance for the red image at various positions in the main scanning direction B at the upstream chart position and the correction distance for the red image at various positions in the main scanning direction B at the downstream chart position, the image processing portion 5 obtains the correction distance for the red image in the respective image areas. Further, on the basis of the correction distance for the blue image at various positions in the main scanning direction B at the upstream chart position and the correction distance for the blue image at various positions in the main scanning direction B at the downstream chart position, the image processing portion 5 obtains the correction distance for the blue image in the respective image areas. The respective correction distances are thus obtained, and the process then proceeds to Step b5.

At Step b5, the image processing portion 5 moves the red image relative to the green image in accordance with the correction distance for the red image in the respective image areas. Further, the image processing portion 5 moves the blue image relative to the green image in accordance with the correction distance for the blue image in the respective image areas. As described above, the red image and the blue image are made to move relatively to the green image in the respective image areas, and the image processing operation is then completed.

The correction distances in the respective image areas may be obtained everytime the document is read by the document reading portion 2. However, the correction distances need not be necessarily obtained in this way. For example, once obtained correction distances for the respective image areas may be stored in the memory portion 6 so that, in the later occasions where a document is read by the document reading portion 2, the correction distances for the respective image areas stored in the memory portion 6 are used to process the document image in the read document. This makes it possible to reduce throughput of the image processing portion 5.

The above-described embodiments are mere exemplification of the invention, and the structures may be modified within the invention. For example, the reference chart may be not the ladder chart but halftones dots. The document reading apparatus may have a configuration such that the light source 13 is disposed in a direction from the document table 12 in which direction the document is placed on the document placement surface 11 of the document table 12. In the above-described first to fifth embodiments, the evaluation value is not limited to the CTF value but may be a modulation transfer function value (abbreviated as MTF value).

Although one line of the first ladder chart is read in the above-described first embodiment, a plurality of lines of the fist ladder chart may be read. In this case, the image processing portion 5 obtains the CTF values in the main scanning direction B, of read respective lines at various positions in the main scanning direction B, and furthermore obtains an average value of those CTF values, which average value is defined as the CTF value in the main scanning direction B at the position. This makes it possible to obtain a more precise CTF value in the main scanning direction B without influences of dust, etc.

Further, the image processing portion 5 obtains a plurality of the CTF values in the sub-scanning direction A at various positions in the main scanning direction B, and furthermore obtains an average value of those CTF values which average value is defined as the CTF value in the sub-scanning direction A at the position. This makes it possible to obtain a more precise CTF value in the sub-scanning direction A without influences of dust, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A document reading apparatus comprising:
   a document reading portion including a document table having a document placement surface, a light source for exposing a document placed on the document placement surface to light, an imaging element for receiving light from the document exposed by the light source, and an imaging optical system for focusing the light from the document onto the imaging element to thereby form an image thereon, which imaging optical system has an imaging lens and a group of mirrors which moves in a sub-scanning direction relative to the document table and leads the light from the document to the imaging lens;
   a first chart portion having a predetermined reference chart, which is disposed at a predetermined first position on the document table;
   a second chart portion having the predetermined reference chart, which is disposed at a predetermined second position spaced away in the sub-scanning direction from the predetermined first position on the document table; and
   an image processing portion that obtains, based on respective chart images of the first and second chart portions which chart images are obtained from the predetermined reference charts read by the document reading portion, respective correction amounts of a plurality of image areas arranged in the sub-scanning direction in a document image of the document read by the document reading portion, and then based on the respective correction amounts, processes the document image.

2. The document reading apparatus of claim 1, wherein the image processing portion obtains, based on the respective chart images, respective correction amounts of a plurality of image areas arranged in the sub-scanning direction in the document image regarding a plurality of image areas arranged in a main scanning direction in the document image, and then based on the respective correction amounts, processes the document image.

3. The document reading apparatus of claim 1, wherein the document reading portion reads the document separately from one color to another among respective colors of red, green, and blue, and
   the image processing portion processes the document image separately from one color to another among the respective colors.

4. The document reading apparatus of claim 1, wherein the image processing portion performs a filtering process to the document image.

5. The document reading apparatus of claim 4, wherein the image processing portion sharpens the document image through the filtering process.

6. The document reading apparatus of claim 4, wherein the image processing portion smoothens the document image through the filtering process.

7. The document reading apparatus of claim 1, wherein the first chart portion and the second chart portion respectively have a first chart-formed surface in which the predetermined reference chart is formed and which abuts on the document placement surface, and a pair of second chart-formed surfaces in each of which the predetermined reference chart is formed and which are disposed across the document placement surface so that a distance between one second chart-formed surface and the document placement surface is equal to a distance between another second chart-formed surface and the document placement surface.

8. The document reading apparatus of claim 1, wherein the first chart portion and the second chart portion respectively have the predetermined reference chart formed therein and a chart-formed surface which is inclined to the document placement surface and protrudes from the document placement surface to both sides of the document placement surface.

9. The document reading apparatus of claim 1, wherein the predetermined reference chart has a first ladder chart composed of sets of two lines extending in the sub-scanning direction, which are different in density and alternately arranged in the main scanning direction, and a second ladder chart composed of sets of two lines extending in the main scanning direction, which are different in density and alternately arranged in the sub-scanning direction.

10. The document reading apparatus of claim 1, wherein the predetermined reference chart has a first ladder chart composed of sets of two lines extending in the sub-scanning direction, which are different in density and alternately arranged in the main scanning direction, and a second ladder chart composed of sets of two lines which extend in a first direction intersecting with the main scanning direction in the document placement surface and which are different in density and alternately arranged in a second direction orthogonal to the first direction in the document placement surface.

11. The document reading apparatus of claim 1, wherein the first chart portion and the second chart portion are detachably disposed on the document table.

12. The document reading apparatus of claim 3, wherein the image processing portion sets one color among the respective colors as a criterion, and moves the document images of remaining colors relative to the document image of the one color acting as the criterion.

13. An image processing method of processing a document image of a document read by a document reading portion including a document table having a document placement surface, a light source for exposing a document placed on the document placement surface to light, an imaging element for receiving light from the document exposed by the light source, and an imaging optical system for focusing the light from the document onto the imaging element to thereby form an image thereon, wherein the imaging optical system has an imaging lens and a group of mirrors which moves in a sub-scanning direction relative to the document table and leads the light from the document to the imaging lens, the image processing method comprising the steps of:

obtaining respective chart images of first chart portion and second chart portion by using the document reading portion to read a predetermined reference chart formed on a first chart portion disposed at a predetermined first position on the document table, and the predetermined reference chart formed on a second chart portion disposed at a predetermined second position spaced away in the sub-scanning direction from the predetermined first position on the document table; and obtaining, based on the respective chart images, respective correction amounts of a plurality of image areas arranged in the sub-scanning direction in the document image, and then based on the respective correction amounts, processing the document image.

* * * * *